United States Patent
Kaku

(10) Patent No.: US 7,991,265 B2
(45) Date of Patent: Aug. 2, 2011

(54) CONTENT RECORDING APPARATUS CAPABLE OF RECORDING LONG CONTENT OUTPUT

(75) Inventor: Junya Kaku, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1192 days.

(21) Appl. No.: 10/578,335

(22) PCT Filed: Oct. 7, 2004

(86) PCT No.: PCT/JP2004/015210
§ 371 (c)(1),
(2), (4) Date: May 4, 2006

(87) PCT Pub. No.: WO2005/046230
PCT Pub. Date: May 19, 2005

(65) Prior Publication Data
US 2009/0022479 A1  Jan. 22, 2009

(30) Foreign Application Priority Data
Nov. 5, 2003  (JP) ................................. 2003-375675

(51) Int. Cl.
*H04N 5/77* (2006.01)
(52) U.S. Cl. ........................................ 386/225; 386/241
(58) Field of Classification Search ............... 386/52, 386/57, 64, 95, 109, 117, 124–126, 224, 386/225, 241
See application file for complete search history.

(56) References Cited

U.S. PATENT DOCUMENTS

| | | | | |
|---|---|---|---|---|
| 5,737,479 | A  * | 4/1998 | Fujinami | 386/241 |
| 6,546,192 | B2 * | 4/2003 | Hisatomi et al. | 386/70 |
| 6,801,712 | B1 * | 10/2004 | Yokouchi | 386/241 |
| 6,928,234 | B2 * | 8/2005 | Tsujii et al. | 386/69 |
| 7,257,317 | B2 * | 8/2007 | Ohnishi | 386/120 |
| 7,417,680 | B2 * | 8/2008 | Aoki et al. | 348/333.05 |

FOREIGN PATENT DOCUMENTS

| | | |
|---|---|---|
| JP | 11-284948 | 10/1999 |
| JP | 2000-175158 | 6/2000 |
| JP | 2001-251585 | 9/2001 |
| JP | 2001-346164 | 12/2001 |
| JP | 2002077803 | * 3/2002 |
| JP | 2002-207625 | 7/2002 |
| JP | 2002-344872 | 11/2002 |
| JP | 2003-224826 | 8/2003 |

OTHER PUBLICATIONS

Machine generated translation of JP 2002-077803 to Oi et al, Mar. 2002.*

* cited by examiner

*Primary Examiner* — David E Harvey
(74) *Attorney, Agent, or Firm* — Kratz, Quintos & Hanson, LLP

(57) ABSTRACT

A content recording apparatus (10) includes an MPEG-4 codec (34). Compressed motion image data output from the MPEG-4 codec (34) in photographing a motion image is a motion image content which expresses a continuous change with time and has an I frame allocated intermittently. A CPU (40) records the compressed motion image data onto a recording medium (38). The CPU (40) also creates motion image index data pointing each frame of the compressed motion image data output from the MPEG-4 codec (34) in parallel with the compression operation by the MPEG-4 codec (34). The created motion image index data is recorded onto the recording medium (38) by the CPU (40) every time that the I frame is specified.

13 Claims, 22 Drawing Sheets

| COLUMN No. | adr | size | type |
|---|---|---|---|
| 0 | | | |
| 1 | | | |
| 2 | | | |
| ⋮ | ⋮ | ⋮ | ⋮ |
| 19 | | | |

FIG. 6
INFO. TMP
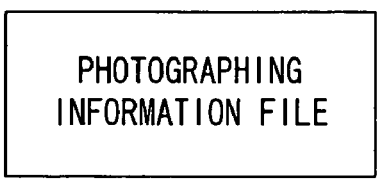
PHOTOGRAPHING INFORMATION FILE
INDEX. TMP
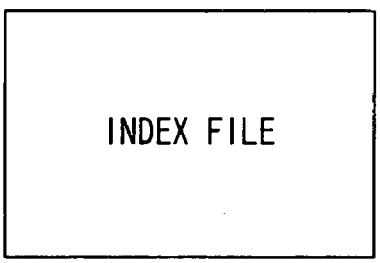
INDEX FILE
DATA. TMP
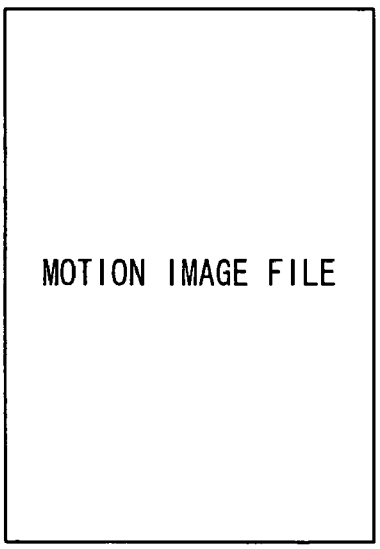
MOTION IMAGE FILE
VCLP000*.MP4
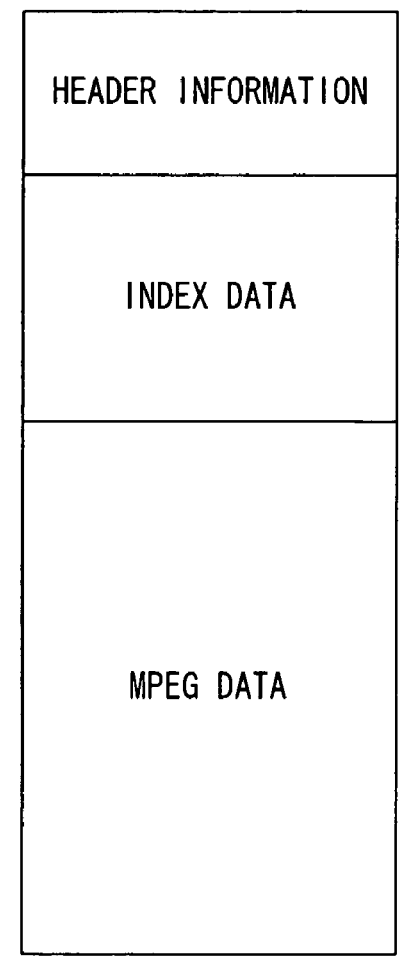
HEADER INFORMATION
INDEX DATA
MPEG DATA

| COLUMN No. | t_offset | t_size |
|---|---|---|
| 0 | | |
| 1 | | |
| 2 | | |
| ⋮ | ⋮ | ⋮ |
| N-1 | | |

| COLUMN No. (lfno) | fno |
|---|---|
| 0 | 0 |
| 1 | 15 |
| 2 | 30 |
| ⋮ | ⋮ |
| M-1 | — |

FIG. 19
(A) HEAD SEARCH SCREEN
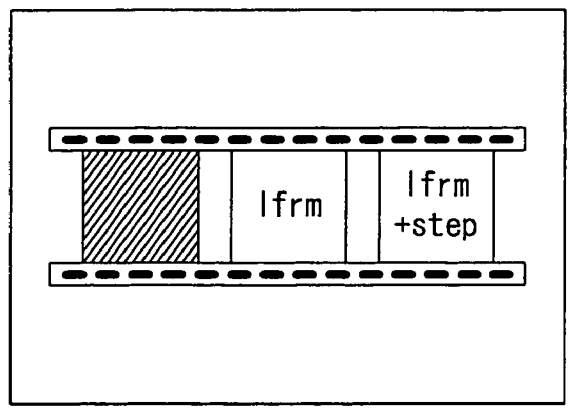
(B) MIDDLE SEARCH SCREEN
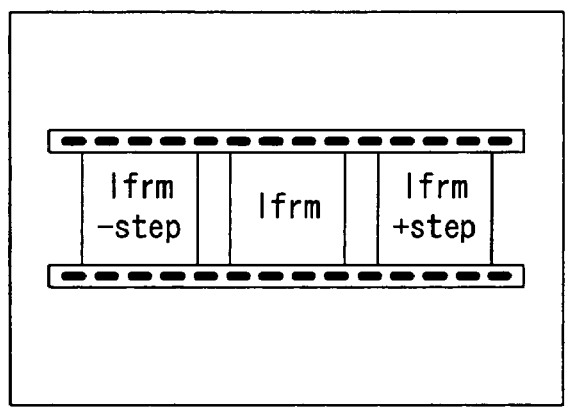
(C) END SEARCH SCREEN
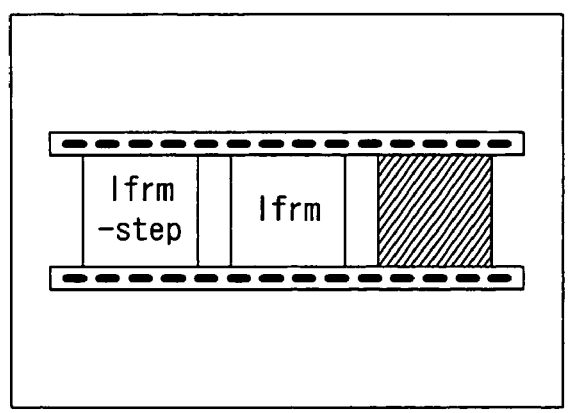

CONTENT RECORDING APPARATUS CAPABLE OF RECORDING LONG CONTENT OUTPUT

TECHNICAL FIELD

The present invention relates to a content recording apparatus. More specifically, the present invention relates to a content recording apparatus which is applied to a digital video camera, and records a motion image content onto a recording medium.

PRIOR ART

One example of such a kind of conventional content recording apparatus is disclosed in a Japanese Patent Laying-open No. 2002-207625 laid-open on Jul. 26, 2002. In this prior art, when a photographing start operation is performed, recording a plurality of frames of still images forming a motion image onto a recording medium, and storing index information for managing each frame of the still images into an internal memory are started. After a photographing end operation is performed, the index information accumulated in the internal memory is collectively recorded onto the recording medium.

However, in the prior art, the index information accumulated in the internal memory is recorded onto the recording medium in response to the photographing end operation. Since the index information is increased with a photographing time period of the motion image, in order to realize photographing for a long time, it is necessary to increase capacity of the internal memory also.

SUMMARY OF THE INVENTION

Therefore, it is a primary object of the present invention to provide a novel content recording apparatus.

Another object of the present invention is to provide a content recording apparatus capable of recording a long-time content onto a recording medium without increasing capacity of an internal memory.

A content recording apparatus according to claim 1 comprises an outputting means for outputting a content which expresses a continuous change with time and has a reference position assigned at an intermittent timing, a first recording means for recording the content output by the outputting means onto a recording medium, a first creating means for creating position information pointing a plurality of positions on the content output by the outputting means in parallel with an output operation of the outputting means, and a second recording means for recording the position information created by the first creating means onto the recording medium every time that the reference position is specified.

The content output by the outputting means is a content which expresses a continuous change with time and has a reference position assigned at an intermittent timing. The first recording means records the content onto the recording medium. The first creating means creates position information pointing a plurality of positions on the content output by the outputting means in parallel with an output operation of the outputting means. The created position information is recorded onto the recording medium by the second recording means every time that the reference position is specified.

The position information created by the first creating means is recorded onto the recording medium every time that the reference position is specified, and whereby, it is possible to reduce the size of the position information to be temporarily stored before recording. As a result, it becomes possible to record the long-time content with a less capacity of an internal memory.

A content recording apparatus of claim 2 according to claim 1 further comprises a memory means for temporarily storing the content output by the outputting means, and the first recording means records the content stored in the memory means onto the recording medium in synchronous with recording by the second recording means. This makes it easy to control recording timing.

In a content recording apparatus of claim 3 according to claim 1, the content is a motion image content encoded by an MPEG format, and the reference position is a position of a frame on which an intra-encoding is performed.

In a content recording apparatus of claim 4 according to claim 3, the plurality of positions includes the reference position and a non-reference position, and the non-reference position is a position of a frame on which an inter-encoding is performed.

In a content recording apparatus of claim 5 according to claim 1, the first recording means stores the content in a first file formed in the recording medium, and the second recording means stores the position information in a second file formed in the recording medium, and the content recording apparatus further comprises a connecting means for connecting the first file and the second file with each other. Connecting the files makes it easy to mange the files.

A content recording apparatus of claim 6 according to claim 5 further comprises a second creating means for creating an index content corresponding to the reference position, and a third recording means for recording the index content created by the second creating means onto the recording medium. By creating the index content, it is possible to easily grasp the outline of the long-time content.

In a content recording apparatus of claim 7 according to claim 6, the third recording means includes a storing means for storing the index content in a third file formed in the recording medium, and a linking means for linking the third file with the connection file.

In a content recording apparatus of claim 8 according to claim 7, the linking means assigns an identifying number the same as the connection file to the third file.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing the other part of the operation of FIG. 1 embodiment;

FIG. 17 is an illustrative view showing one example of an index information table for reproducing applied to FIG. 1 embodiment;

FIG. 18 is an illustrative view showing one example of an I frame table applied to FIG. 1 embodiment;

FIG. 19 (A) is an illustrative view showing one example of head index image;

FIG. 19 (B) is an illustrative view showing one example of middle index image;

FIG. 19 (C) is an illustrative view showing one example of end index image;

BEST MODE FOR PRACTICING THE INVENTION

Figure 1:
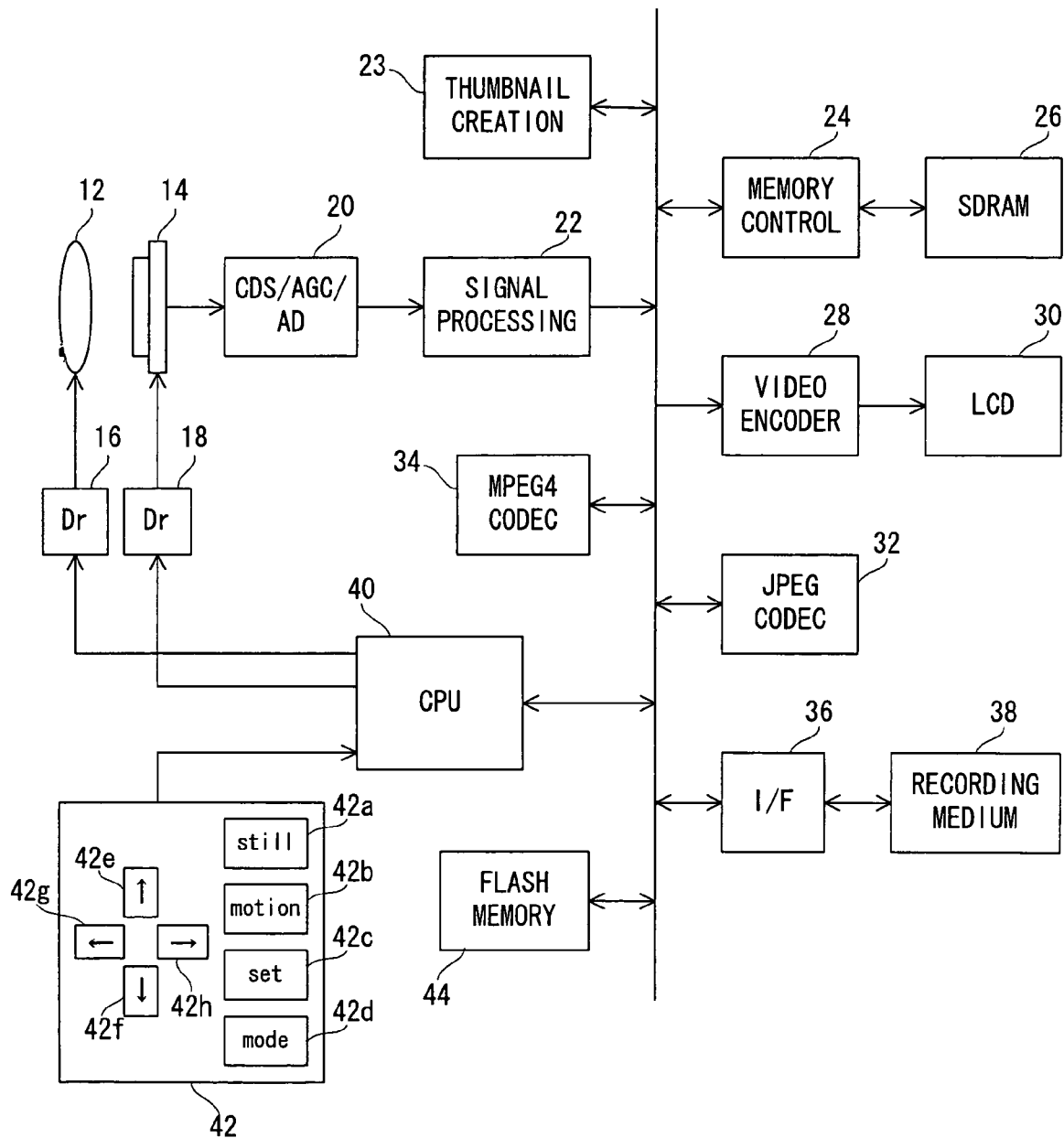
FIG. 1 is a block diagram showing one embodiment of the present invention.

Referring to FIG. 1, a digital video camera 10 of this embodiment includes a focus lens 12. An optical image of an object scene is irradiated through the focus lens 12 onto an imaging surface of an image sensor 14. On the imaging surface, electric charges corresponding to the optical image of the object scene, that is, a raw image signal is generated by photo-electronic conversion.

When a camera mode is selected by a mode key 44d provided on a key input device 42, a through image process, that is, a process for displaying a real-time motion image of the object scene on an LCD monitor 26 is executed. The CPU 40 first instructs the driver 18 to repeat a pre-exposure and a thinning-out reading. The driver 18 executes the pre-exposure of the image sensor 14 and the thinning-out reading of the raw image signal thus generated. The pre-exposure and thinning-out reading are executed in response to a vertical synchronization signal generated per 1/30 seconds. Thus, a low-resolution raw image signal corresponding to the optical image of the object scene is output from the image sensor 18 at a frame rate of 30 fps.

Each frame of the output raw image signal is subjected to a series of processes such as a noise removal, a level adjustment, and A/D conversion by a CDS/AGC/AD circuit 20 to thereby obtain raw image data of a digital signal. A signal processing circuit 22 performs processes such as a white balance adjustment, color separation, YUV conversion, etc. on the raw image data output from the CDS/AGC/AD circuit 20 to thereby generate image data in a YUV format. Each frame of the generated image data is written to an SDRAM 26 by a memory control circuit 24, and then read by the same memory control circuit 24.

A video encoder 28 converts the image data read by the memory control circuit 24 into a composite video signal in an NTSC format, and applies the converted composite video signal to the LCD monitor 30. As a result, a through-image of the object scene is displayed on the monitor screen. It should be noted that although description is omitted as necessary below, access to the SDRAM 26 is sure to be done through the memory control circuit 24.

Figures 2, 3:
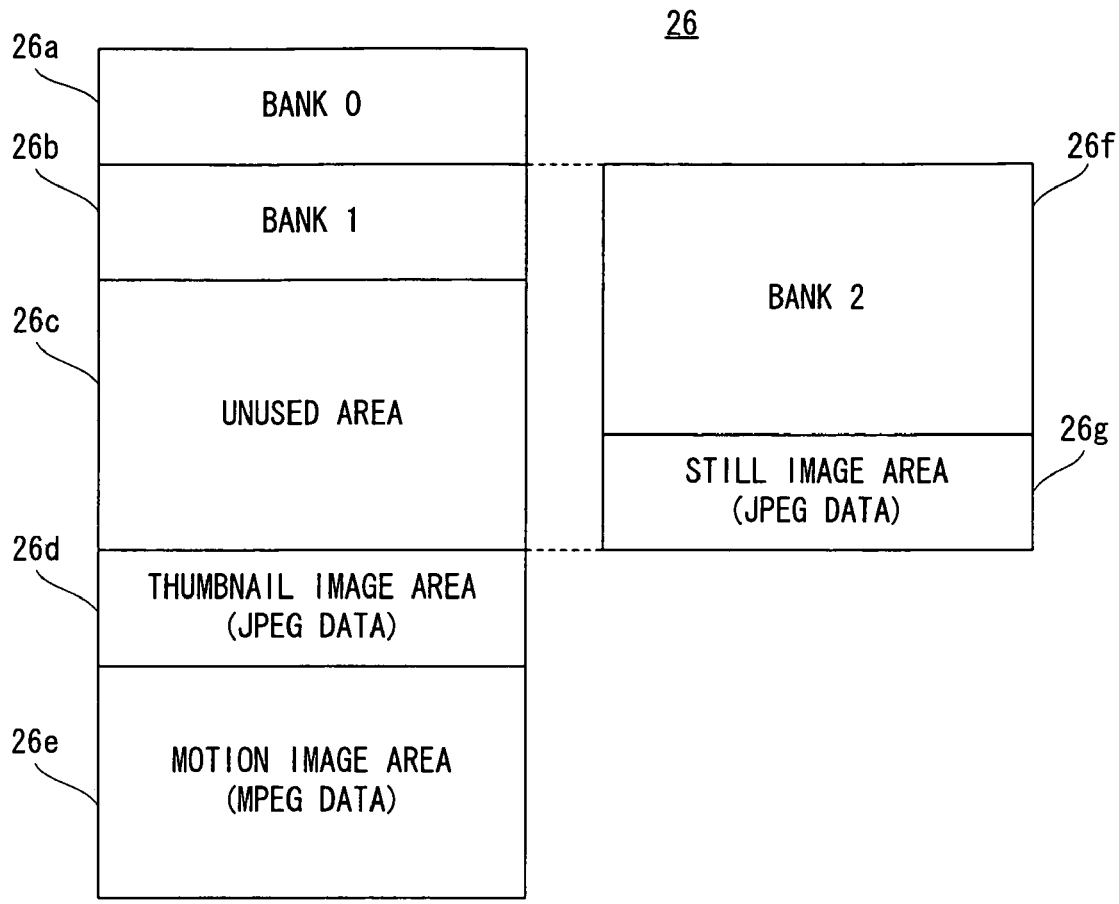
FIG. 2 is an illustrative view showing one example of a mapping state of an SDRAM applied to FIG. 1 embodiment.
FIG. 3 is an illustrative view showing one example of an index information table applied to FIG. 1 embodiment.

When a process relating to the motion image is executed, on the SDRAM 26 is formed a bank 26a (bank0) and a bank 26b (bank 1) as shown in FIG. 2. The CPU 40 switches a designation of the banks between the banks 26a and 26b every time that the vertical synchronization signals is generated. The signal processing circuit 22 writes the image data to the bank designated by the CPU 40, and the video encoder 28 reads the image data from the bank different from the bank designated by the CPU 40.

When the motion image photographing key 42b is operated, the CPU 40 activates an MPEG-4 codec 34. The MPEG-4 codec 34 fetches the image data read for the video encoder 28, and performs a compression process according to a simple profile of the MPEG-4 format on each frame of the fetched image data. The image data is subjected to an intra-encoding per approximately 15 frames, and subjected to an inter-encoding at the remaining frames. The compressed motion image data thus generated is written to a motion image area 26e of the SDRAM 26.

Figure 4:
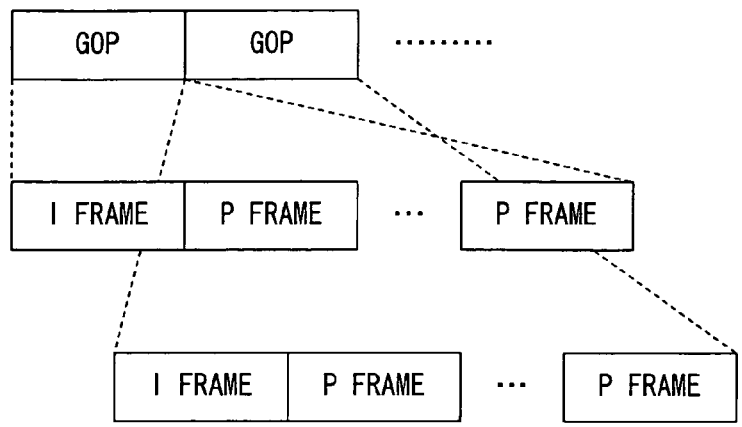
FIG. 4 is an illustrative view showing one example of a structure of MPEG data.

The frame on which the intra-encoding is performed is defined as "I frame", and the frame on which the inter-encoding is performed is defined as a "P frame". A chunk formed of an I frame and a plurality of succeeding P frames shall be defined as a "GOP (Group Of Pictures)". As a result, the compressed motion image data has a data structure shown in FIG. 4.

The CPU 40, every time that one frame of the compressed motion image data is generated, obtains a size size and a type type (I frame or P frame) of the compressed motion image data from the MPEG-4 codec 34, and writes index data including these information, that is, motion image index data to an index information table 26h shown in FIG. 3. A column number is assigned to each frame of the written motion image index data. It should be noted that such an index information table 26h is also created on the SDRAM 26.

When the type obtained from the MPEG-4 codec 34 indicates the I frame, the CPU 40 sets a corresponding writing instruction in the instruction list (not illustrated) in order to write to the recording medium 38 the compressed motion image data and motion image index data that have been accumulated until that time in the motion image area 26e and the index information table 26h, respectively.

When the type obtained from the MPEG-4 codec 34 indicates the I frame, the CPU 40 further instructs a thumbnail creation circuit 23 to perform a creating process of thumbnail image data, and instructs a JPEG codec 32 to perform a compression process on the thumbnail image data.

The thumbnail creation circuit 23 reads uncompressed image data corresponding to the I frame from the bank 26a or 26b, performs a thinning-out process on the read image data to create thumbnail image data, and writes the created thumbnail image data to the bank 26a or 26b (the same as a reading destination). The JPEG codec 32 reads the thumbnail image data from the SDRAM 26, compresses the read thumbnail image data, and writes the compressed thumbnail image data to an index image area 26d.

When the compressed thumbnail image data is retained in the SDRAM 26, the CPU 40 sets to the instruction list a writing instruction of the compressed thumbnail image data and a writing instruction of the index data for managing the compressed thumbnail image data, that is, the thumbnail index data.

Figure 5:
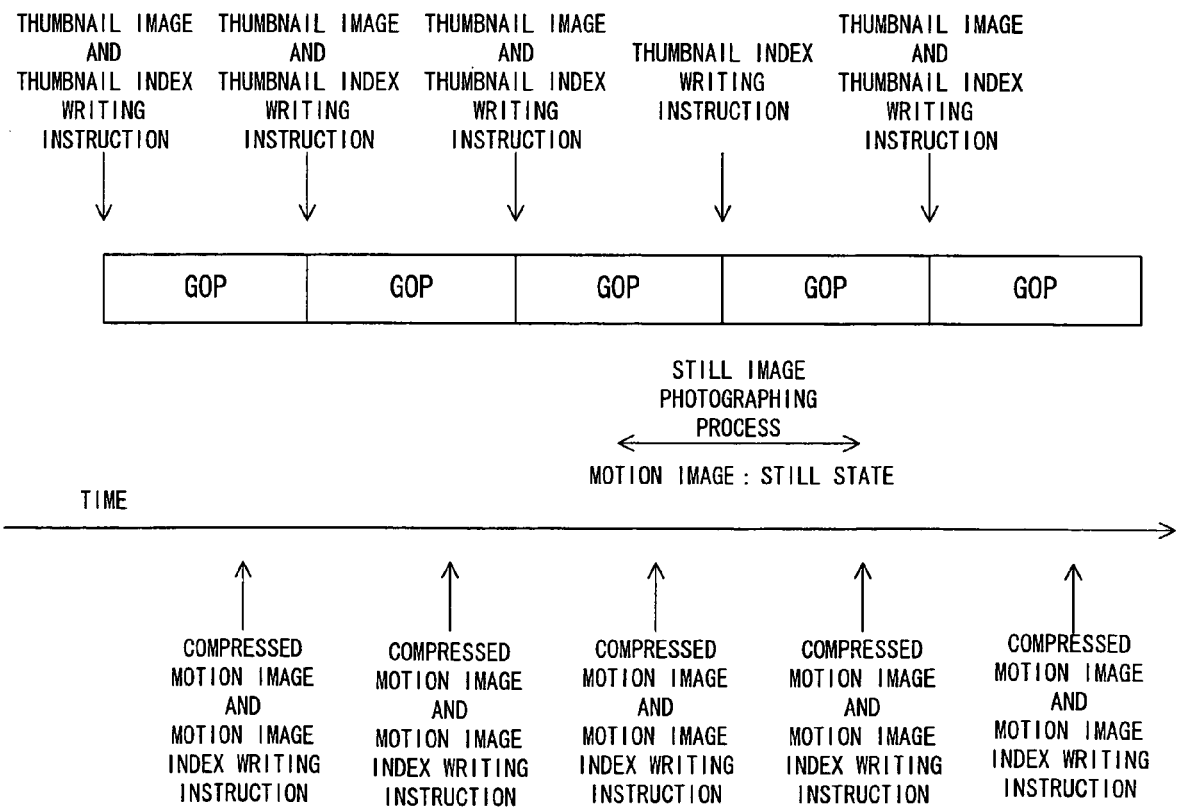
FIG. 5 is an illustrative view showing another part of an operation of FIG. 1 embodiment.

Issuing timing of the writing instruction relating to the compressed motion image data and the writing instruction relating to the compressed thumbnail image data are shown in FIG. 5. The writing instruction relating to the compressed thumbnail image data is generated at a head of each of the GOPs, and the writing instruction relating to the compressed motion image data is generated at the end of each of the GOPs. That is, both of the writing instructions are intermittently issued at a cycle according to the number of frames forming the GOP.

The CPU 40 is a multitasking CPU installed with a multitasking OS such as µITRON, and an instruction set to the instruction list is executed by a BG (Back Ground) task.

The compressed motion image data, the motion image index data, the compressed thumbnail image data and the thumbnail index data are recorded onto the recording medium 38 through the I/F 36 by execution of the BG task. The compressed motion image data is stored in a motion image file DATA.TMP, and the motion image index data is stored in an index file INDEX.TMP. Also, the compressed thumbnail image data is written to a motion image file for search VCLP000*.MSH, and the thumbnail index data is written to an index file for search VCLP000*.MDX.

The motion image photographing information such as a frame rate, resolution of a motion image is written to a photographing information file INFO.TMP within the recording medium 38 when a motion image photographing is started. The writing is also executed by the BG task.

It should be noted that the recording medium 38 employs an FAT (File Allocation Table) system as a file management system, and the recorded data is discretely managed on a cluster-by-cluster basis. Furthermore, the recording medium 38 is a removable semiconductor memory, and becomes accessible by the I/F 36 when being inserted into a slot not shown.

When a still image photographing key 42a is operated during the aforementioned motion image photographing process, the CPU 40 controls a driver 16 to set the focus lens 12 to a focal point, sets an optimal exposure time to a driver 18, and sets a white balance adjustment gain set in the signal processing circuit 22 to an optimum value. After adjustment of the imaging condition is thus completed, the CPU 40 instructs the driver 18 to perform a one-time primary exposure and a one-time all pixel reading. The driver 18 performs a one-time primary exposure on the image sensor 14 and a one-time all pixels reading on the generated raw image signal. Thus, a high-resolution raw image signal corresponding to the optical image of the object scene is output from the image sensor 18.

The output raw image signal is converted into still image data in the YUV format through the aforementioned process, and the converted still image data is written to the SDRAM 26. Referring to FIG. 2, when the still image photographing key 42a is operated, a bank 26f (bank 2) and a still image area 26g are formed in the SDRAM 26 in place of the bank 26b and an unused area 26c. The still image data is written to the bank 26f.

The CPU 40 also issues a compression instruction to the JPEG codec 32. The JPEG codec 32 reads the still image data from the bank 26f, performs a JPEG compression on the read still image data, and writes the compressed still image data to the still image area 26g. The CPU 40 then reads the compressed still image data from the still image area 26g, and records a still image file including the read still image data onto the recording medium 38.

The output of the low-resolution raw image signal forming the motion image and the switch of the banks between the banks 26a and 26b are interrupted during a period when such a still image photographing process is executed. It should be noted that the MPEG-4 codec 34 is in a start-up state, the image data stored in the bank 26a is repeatedly read by the MPEG-4 codec 34 so as to be subjected to a compression process. Thus, the compressed motion image data generated during a period when a still image photographing process is executed corresponds to the still image at a time when the still image photographing key 42a is operated.

When obtaining type information indicative of the I frame from the MPEG-4 codec 34 during execution of the still image photographing process, the CPU 40 suspends the generating process of the compressed thumbnail image data. This is because the JPEG codec 32 is occupied for the sake of photographing a still image, so that even if the thumbnail image data is created, a compression process cannot be executed. It should be noted that the setting of the writing instruction of the thumbnail index data is performed. That is, as shown in FIG. 5, even during the still image photographing process, a writing instruction of the thumbnail index data is issued. The thumbnail index data points the compressed thumbnail image data corresponding to a GOP directly before. Accordingly, when the compressed thumbnail image data is reproduced on the basis of the index data, the thumbnail images of the same frame are successive.

When the motion image photographing key 42b is operated again, the CPU 40 disables the MPEG-4 codec 34, and sets in the instruction list the writing instruction relating to compressed motion image data and motion image index data remaining in the SDRAM 26. Thus, the compressed motion image data and the motion image index data are stored in the motion image file DATA.TMP and the index file INDEX.TMP without absence.

After completion of the BG task, the CPU 40 adds dummy data to each of the photographing information file INFO.TMP, the motion image file DATA.TMP and the index file INDEX.TMP such that a file size becomes an integral multiple of a cluster size. After the addition of the dummy data, the CPU 40 connects the photographing information file INFO.TMP, the index file INDEX.TMP, and the motion image file DATA.TMP in a manner shown in FIG. 6. A normal motion image file VCLP000*.MP4 thus obtained satisfies a QuickTime format.

It should be noted that as to the motion image file VCLP000*.MP4, a motion image file for search VCLP000*.MSH, and an index file for search VCLP000*.MDX, "000*" denotes a file number. The file number is common to the simultaneously created files.

Figure 7:
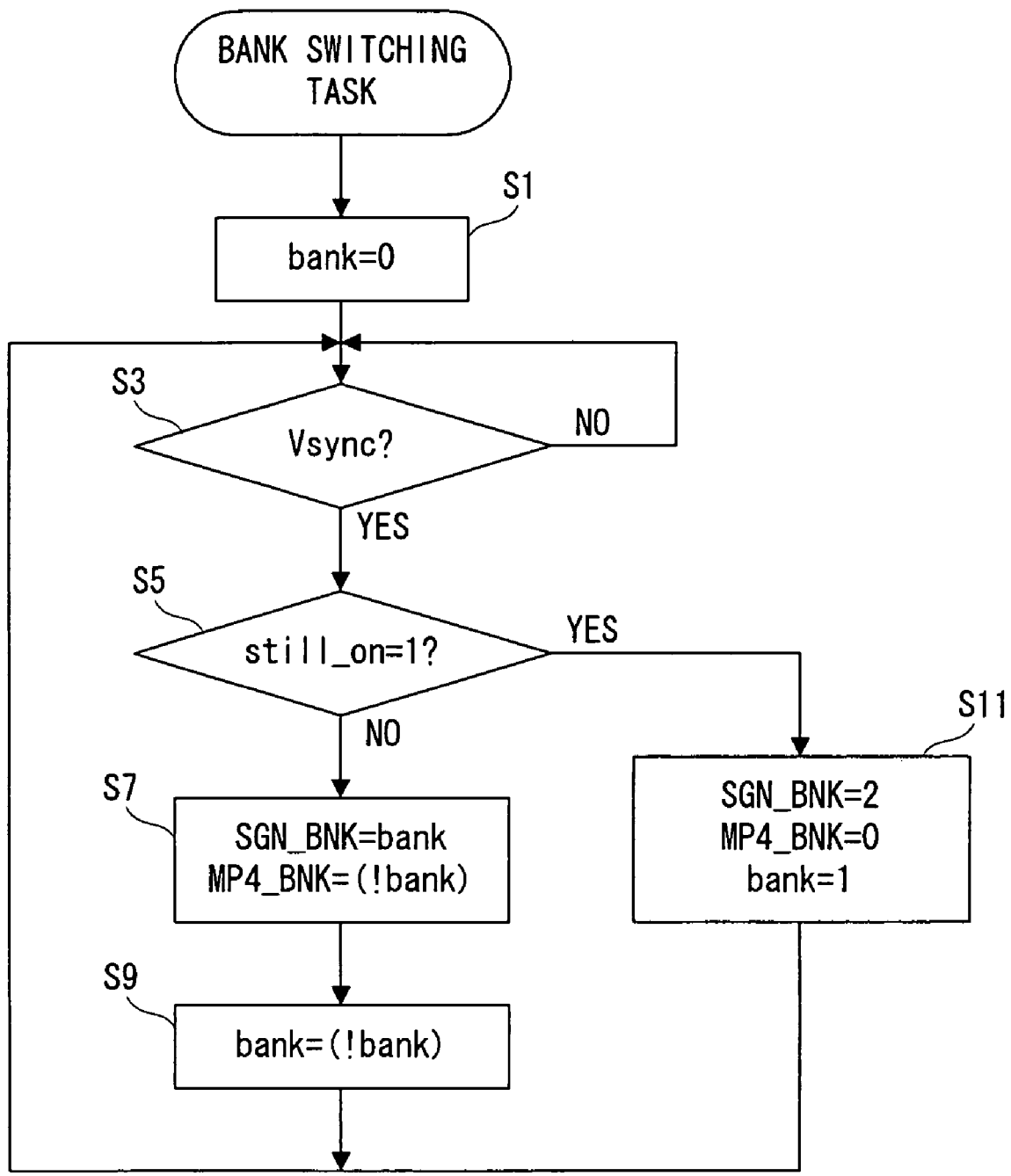
FIG. 7 is a flowchart showing a part of an operation of FIG. 1 embodiment.
Figure 15:
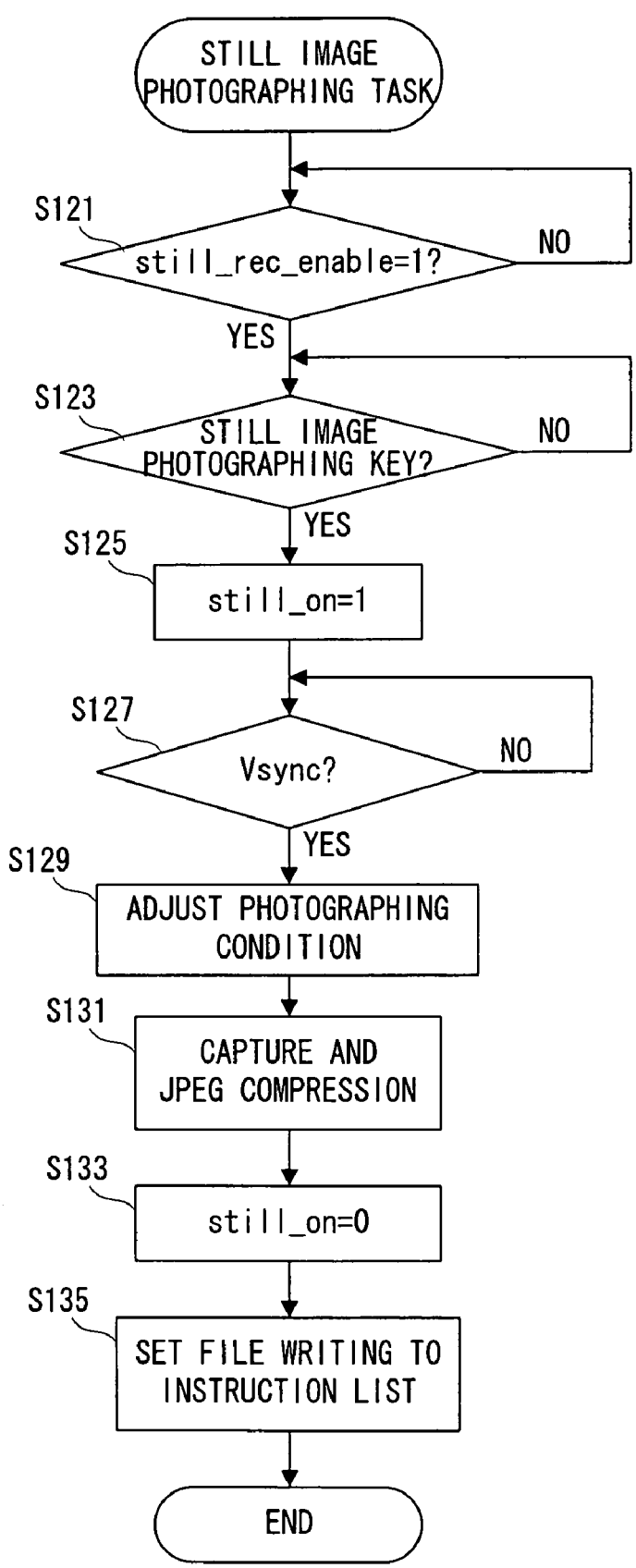
FIG. 15 is a flowchart showing the other part of the operation of FIG. 1 embodiment.

When a camera mode is selected, the CPU 40 executes in parallel a bank switching task according to a flowchart shown in FIG. 7, a motion image photographing task according to a flowchart shown in FIG. 8-FIG. 14, a still image photographing task according to a flowchart shown in FIG. 15, and a BG (Back Ground) task according to a flowchart shown in FIG.

16. It should be noted that control programs corresponding to these flowcharts are stored in the flash memory 44.

First, with referring to FIG. 7, in a step S1, a variable bank is set to "0", and in a step S3, it is determined the presence or absence of generation of the vertical synchronization signal. The variable bank is a variable for designating any one of the banks 26a and 26b shown in FIG. 2, and "0" denotes the bank 26a, and "1" denotes the bank 26b. By the process in the step S1, the bank 26a is first designated.

If "YES" is determined in the step S3, it is determined whether or not the variable still_on is "1" in a step S5. The variable still_on is a variable for determining a running state of the still image photographing process, "0" denotes a non-running state, and "1" denotes a running state. Therefore, while the still image photographing process is not executed, the process returns to the step S3 through steps S7 and S9, and while the still image photographing process is executed, the process returns to the step S3 through the process in a step S11.

In the step S7, the bank designated by the variable bank is determined as a writing destination bank SGN_BNK for the motion image data output from the signal processing circuit 22, and the bank not designated by the variable bank is determined as a reading destination bank MP4_BNK for the motion image data directed to the MPEG-4 codec 34. If the variable bank is "0", the bank 26a becomes the writing destination bank SGN_BNK, and the bank 26b becomes the reading destination bank MP4_BNK. On the contrary thereto, if the variable bank is "1", the bank 26a becomes the reading destination bank MP4_BNK, and the bank 26b becomes the writing destination bank SGN_BNK.

In the step S9, the variable bank is changed in a toggle manner. If the current numerical value is "0", the changed numerical value is "1", and if the current numerical value is "1", the changed numerical value becomes "0".

In the step S11, the bank 26f is determined as a writing destination bank SGN_BNK, the bank 26a is determined as a reading destination bank MP4_BNK, and the variable bank is set to "1". While the still image photographing process is executed, the bank 26f and the still image area 26g are validated in place of the bank 26b and the unused area 26c, and therefore, the bank 26f becomes the writing destination bank SGN_BNK. It should be noted that the reason why the variable bank is set to "1" is for writing to the bank 26b the image data of the first frame directly after the motion image photographing process is restarted.

Figure 8:
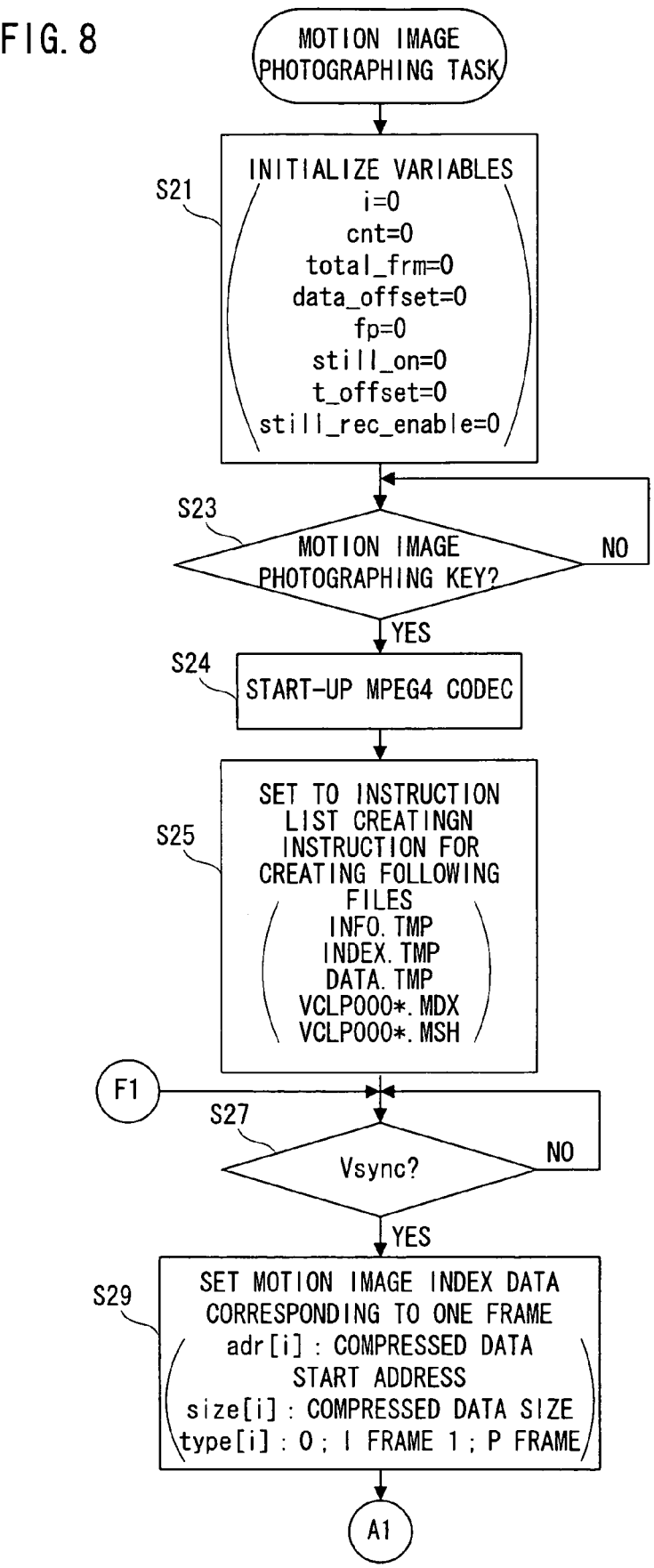
FIG. 8 is a flowchart showing another part of the operation of FIG. 1 embodiment.
Figure 9:
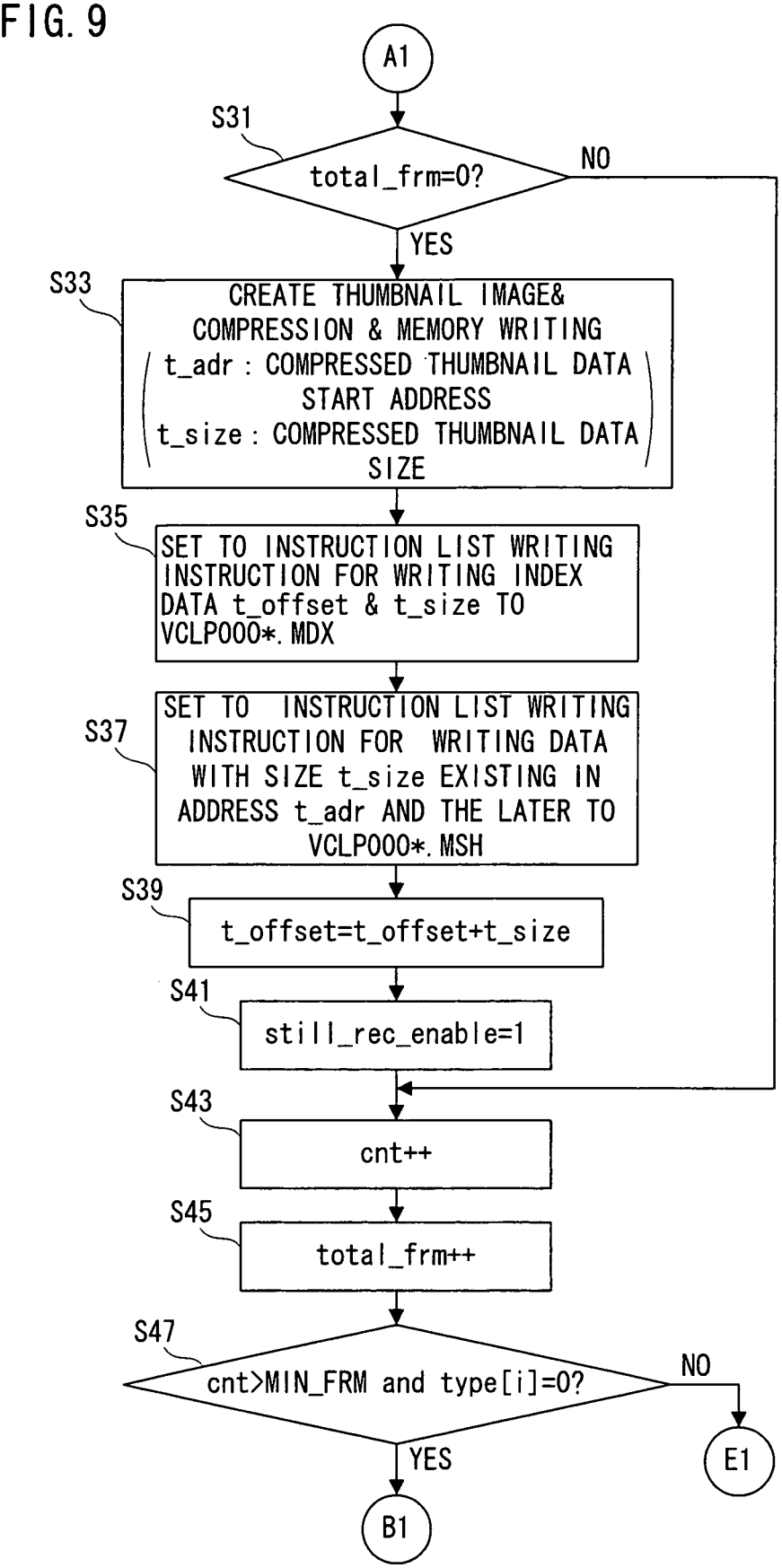
FIG. 9 is a flowchart showing the other part of the operation of FIG. 1 embodiment.
Figure 10:
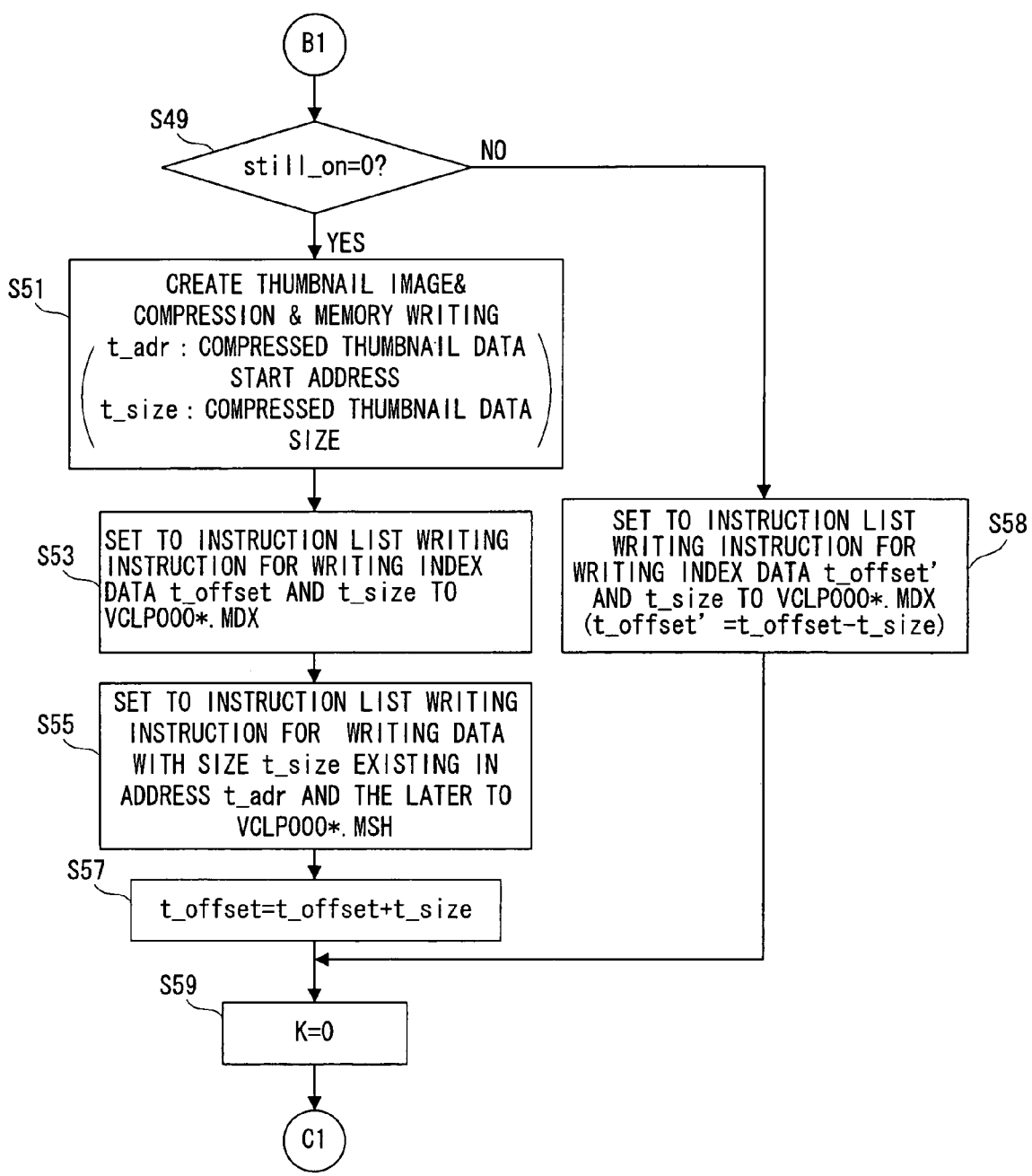
FIG. 10 is a flowchart showing a further part of the operation of FIG. 1 embodiment.
Figure 11:
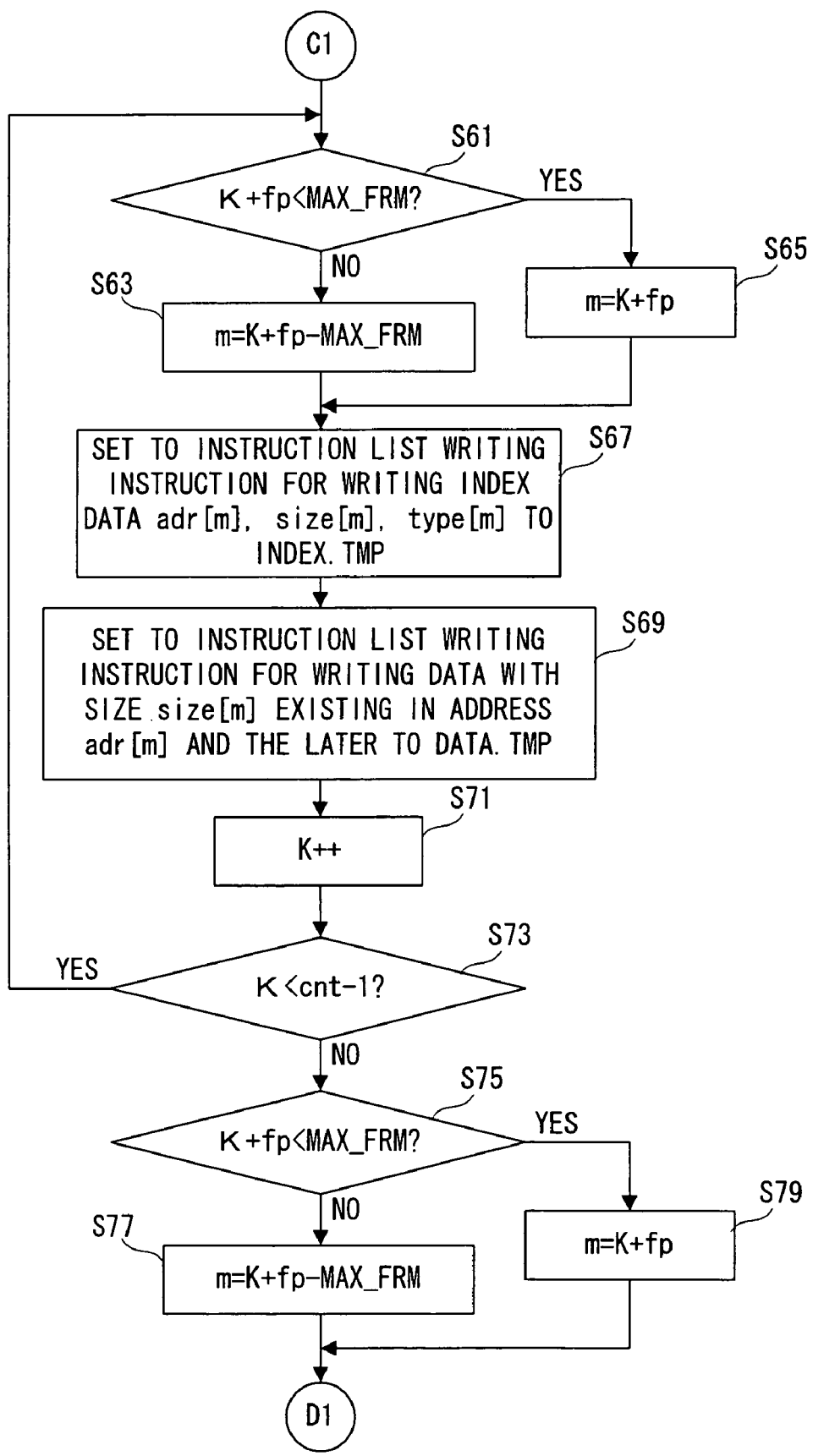
FIG. 11 is a flowchart showing another part of the operation of FIG. 1 embodiment.
Figure 12:
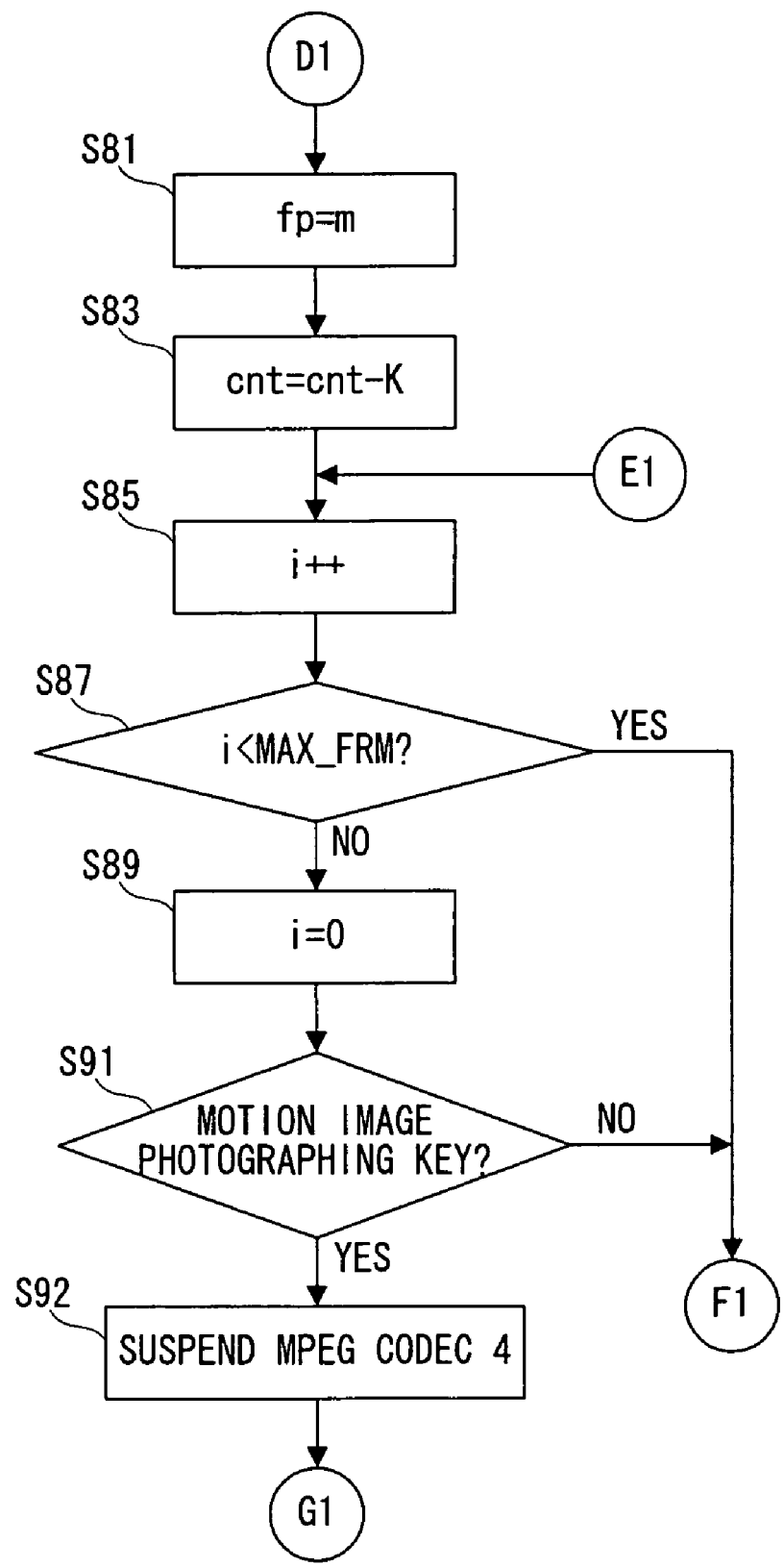
FIG. 12 is a flowchart showing the other part of the operation of FIG. 1 embodiment.
Figure 13:
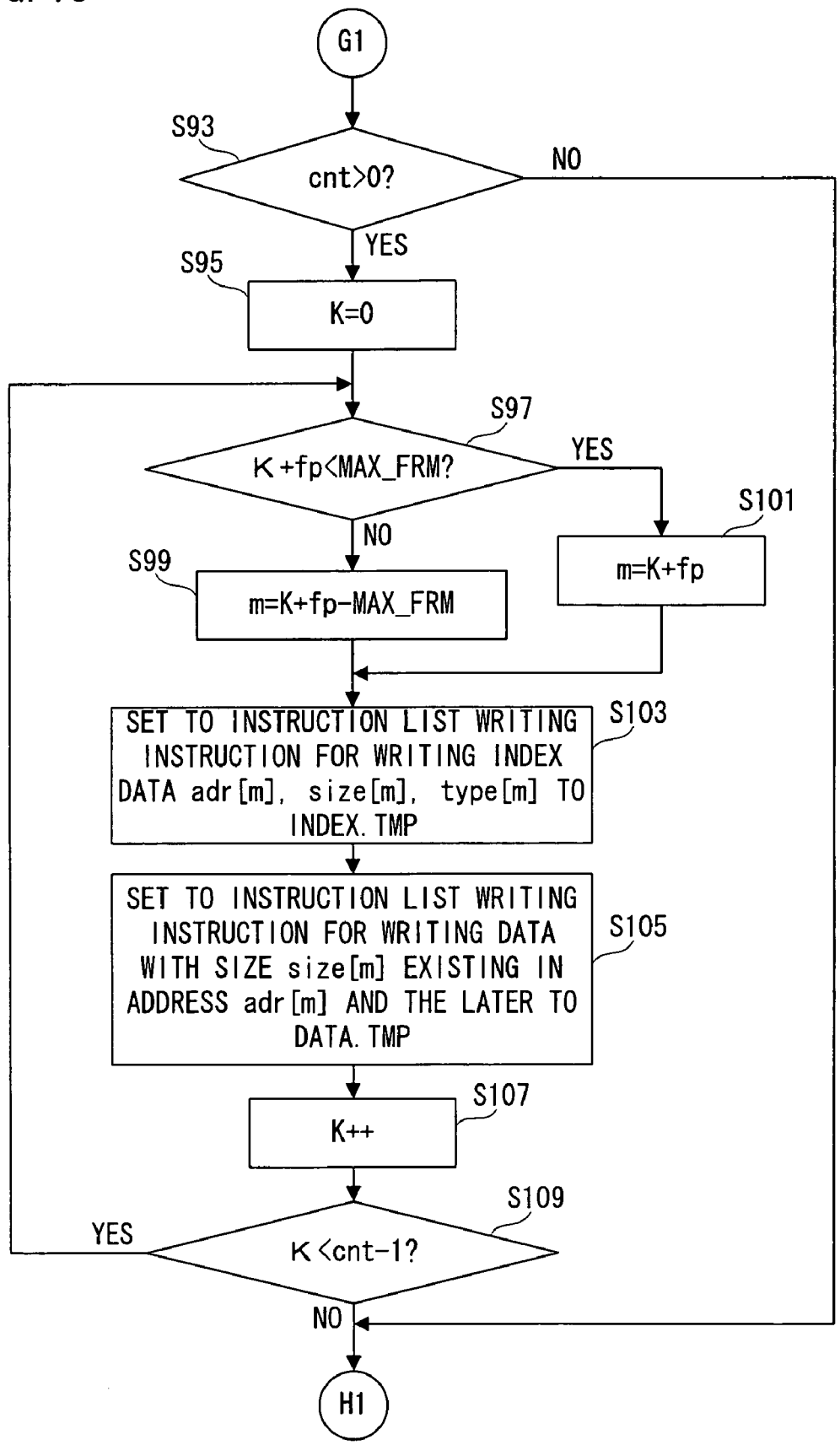
FIG. 13 is a flowchart showing a further part of the operation of FIG. 1 embodiment.
Figure 14:
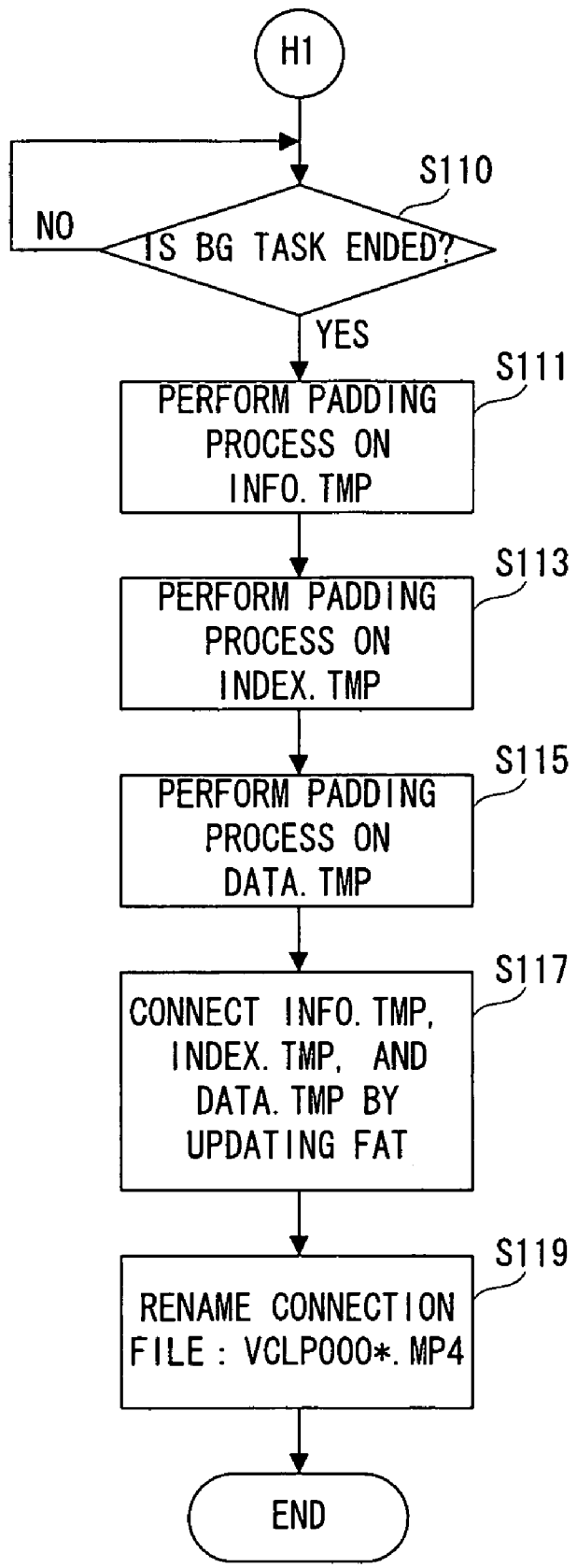
FIG. 14 is a flowchart showing another part of the operation of FIG. 1 embodiment.

Referring to FIG. 8, in a step S21, various variables are initialized. A variable i is a variable for indicating to which column of the index information table 40t the obtained motion image index data is to be written, and a variable cnt is a variable indicating a count value of the number of frames forming a notable GOP. A variable total_frm is a variable for indicating a total number of frames of the motion image to be recorded, and a variable data_offset is a variable indicating how much the writing address of the compressed motion image data is deviated from the head of the motion image file DATA.TMP.

A variable fp is a variable for indicating to which column of the index information table 40t the motion image index data of a head frame forming the notable GOP is written, and the variable still_on is a variable for determining a running state of the still image photographing process as described above.

The variable t_offset is a variable for indicating how much the writing address of the thumbnail index data is deviated from the head of the index file for search VCLP000*.MDX.

The variable still_rec_enable is a variable for determining whether or not a still image is photographable, "0" means unphotographable, and "1" means photographable.

In a step S23, it is determined whether or not a moving image photographing key 44 is operated. If "YES" is determined here, the MPEG-4 codec 34 is started-up in a step S24. In a step S25, in order to create onto the recording medium 38 the photographing information file INFO.TMP, the index file INDEX.TMP, the motion image file DATA.TMP, the index file for search VCLP000*.MDX, and the motion image file for search VCLP000*.MSH, a file creation instruction is set to the instruction list (not illustrated). The file creation instruction is executed by the BG task, and this creates the above-described five files onto the recording medium 38.

In a step S27, it is determined the presence or absence of the vertical synchronization signal, and if "YES" is determined, one frame of notable motion image index data is set to the index information table 26h in a step S29. The information included in the motion image index data includes an address adr indicating a writing start position of the compressed motion image data within the SDRAM 26 other than the above-described size size and type type. Such a motion image index data is written to the i-th column of the index information table 40t.

In a step S31, it is determined whether or not the variable total_frm is "0", and if "NO", the process directly proceeds to a step S43 while if "YES", the process proceeds to the step S43 through steps S33-S41.

In the step S33, in order to create the compressed thumbnail image data of the head frame, a creating instruction and a compression instruction are respectively applied to the thumbnail creating circuit 23 and the JPEG codec 32. The compression instruction to be applied to the JPEG codec 32 includes a size t_size indicating a target compression size of the thumbnail image data and an address t_adr indicating a writing start position of the compressed thumbnail image data in the SDRAM 26. It should be noted that the address t_adr is a head address of the thumbnail image area 26d shown in FIG. 2.

The thumbnail image creating circuit 23 reads the image data written to the bank 26a or 26b of the SDRAM 26, performs a thinning-out process on the read image data to create thumbnail image data, and writes the created thumbnail image data to the bank 26a or 26b (the same as the reading destination). The JPEG codec 32 reads the thumbnail image data stored in the bank 26a or 26b, compresses the read thumbnail image data into the size t_size, and then writes the compressed thumbnail image data to the address t_adr and the later of the SDRAM 26.

In the step S35, in order to write the thumbnail index data including the offset t_offset and the size t_size to the index file for search VCLP000*.MDX, a corresponding writing instruction is set to the instruction list. In the step S37, in order to write the data with the size t_size existing in the address t_adr and the later to the motion image file for search VCLP000*.MSH, a corresponding writing instruction is set to the instruction list. These instructions are executed by the BG processing, and whereby, the index data is written to the index file for search VCLP000*.MDX, and the compressed thumbnail image data created in the step S33 is written to the motion image file for search VCLP000*.MSH.

In the step S39, the size t_size is added to the current offset offset in order to update the offset t_offset, and in the step S41, the variable still_rec_enable is set to "1" to make a still image photographable.

In steps S43 and S45, the variables cnt and total_frm are incremented, respectively. In a step S47, it is determined whether or not the variable cnt is larger than a constant MIN_FRM (=10) and the type type which is written to the i-th column of the index information table 40t is "0". Here, when the I frame appears after a lapse of more than ten frames from a certain frame, "YES" is determined. In other words, when the I frame appears after a lapse of 10 frames or less, or when the I frame does not appear even after a lapse of more than ten frames, "NO" is determined. If "NO" is determined, the process proceeds to a step S85 while if "YES" is determined, the process proceeds to a step S49.

In the step S49, it is determined whether or not the value of the variable still_on is "0". If the sill image photographing process is not executed, "YES" is determined in the step S49, and the process the same as the above-described step S33-S39 are executed in steps S51-S57. Therefore, as long as the still image photographing process is not executed, the compressed thumbnail image data is created every time the I frame is detected at a cycle exceeding 10 frames.

If the still image photographing process is executed, the JPEG codec 32 cannot be used, and therefore, the process in a step S58 is executed. In the step S58, in order to write the thumbnail index data including the offset t_offset' and the size t_size to the index file for search VCLP000*.MDX, the corresponding writing instruction is set to the instruction list. Here, the offset t_offset' is a value obtained by subtracting the size t_size from the current offset t_offset. The thumbnail index data designates the frame the same as the frame pointed by the previous thumbnail index data.

In a step S59, a variable K is set to "0", and in a step S61, it is determined whether or not the added value of the variables K and fp is below the constant MAX_FRM (=20). If "NO" is determined here, the variable m is determined in accordance with an equation 1 in a step S63, and if "YES" is determined, the variable m is determined in accordance with an equation 2.

[Equation 1]

$$m = K + fp - MAX\_FRM$$

[Equation 2]

$$m = K + fp$$

The constant MAX_FRM is equal to the tonal number of columns assigned to the index information table 40t. The variable m obtained from the arithmetic operation of the equation 1 or the equation 2 indicates any one of "0"-"19". The column in which the motion image index data to be read from the index information table 40t is stored is specified from the variable m.

In a step S67, in order to write the motion image index data assigned to the column corresponding to the variable m to the index file INDEX.TMP, the corresponding writing instruction is set to the instruction list. In the step S37, in order to write to the motion image file DATA.TMP the data existing in the address indicated by the address adr assigned to the variable m and the later and corresponding to the size size assigned to the variable m, a corresponding writing instruction is set to the instruction list. These instructions are executed by the BG process, and whereby, the motion image index data is written to the index file INDEX.TMP, and one frame of the compressed motion image data is written to the motion image file DATA.TMP.

In a step S71, the variable K is incremented. It is determined whether or not the updated variable K is below the numerical value "cnt-1" in a step S73, and if "YES", the process returns to the step S61. By the increment of the variable K, the variable m is also incremented. Thus, the motion image index data and the compressed motion image data corresponding to the successive frames are respectively stored in the index file INDEX.TMP and the motion image file DATA.TMP. The processes in the steps S61-S73 is interrupted at a time when the variable K reaches the numerical value "cnt-1". This means that file writing of the index data and the compressed motion image data are executed for each integral multiple of the GOP.

In succeeding steps S75-S79, the process the same as the steps S61-S65 are executed, and in a step S81, the variable m is set to the variable fp. The updated variable fp is utilized for a process in an upcoming step S61. In a step S83, the variable K is subtracted from the variable cnt. The subtracted variable cnt indicates "1", and thus, a head frame of the following GOP is noted.

In a step S85, the variable i is incremented, and in a step S87, it is determined whether or not the updated variable i is below the constant MAX_FRM. If "YES" is determined here, the process returns to the step S27 while if "NO" is determined, the variable i is initialized so as to designate a head of the column of the index information table 40t as a writing destination. In a step S91, it is determined whether or not a photographing end operation is performed by the motion image photographing key 42b. If "NO" is determined here, the process returns to the step S27 while if "YES" is determined, the MPEG-4 codec 34 is disabled in a step S92, and then, the process proceeds to a step S93.

In the step S93, it is determined whether or not the variable cnt exceeds "0". If "NO" is determined here, it is considered that unrecorded data does not exist, the process directly proceeds to a step S111 while if "YES" is determined, it is considered that the unrecorded data exists in the SDRAM 26, and then, the processes in steps S95-S109 are executed. It should be noted that the processes are the same as the processes in the steps S59-S73. Thus, the motion image index data and the compressed motion image data remaining in the SDRAM 26 are respectively written to the index file INDEX.TMP and the motion image file DATA.TMP. If "YES" is determined in the step S109, the process proceeds to a step S110.

In the step S110, it is determined whether or not the BG task is completed. If "YES" is determined, a padding process is performed on the photographing information file INFO.TMP, the index file INDEX.TMP, and the motion image file DATA.TMP in steps S111-S115. More specifically, dummy data is added to the end of each file such that the file size becomes the integral multiple of the cluster size. In a step S117, by updating the FAT, the photographing information file INFO.TMP, the index file INDEX.TMP, and the motion image file DATA.TMP are connected with each other. In a step S19, a filename "VCLP000*.MP4" is assigned to the normal motion image file obtained by the file connection.

Referring to FIG. 15, in a step S121, it is determined whether or not the variable still_rec_enable is "1". If "YES" here, it is considered that the still image is photographable, and the presence or absence of an operation of the still image photographing key 42a is determined in a step S123. When the operation is performed, the variable still_on is set to "1" in a step S125, and after generation of a vertical synchronization signal is waited, the process proceeds from a step S127 to a step S129. In the step S129, a photographing condition, such as a focus, an exposure amount, white balance, etc. is adjusted, and in a step S131, capture of the still image and JPEG compression are executed. More specifically, the driver 18 is instructed to perform a primary exposure and an all pixel reading, and the JPEG codec 32 is instructed to perform JPEG compression. The high-resolution still image data is first written to the bank 26f shown in FIG. 2, and then, subjected to JPEG compression by the JPEG codec 32. The compressed still image data is written to the still image area 26g shown in FIG. 2.

After completion of the process, the variable still_on is set to "0" in a step S133. In a step S135, a creating instruction for creating the still image file onto the recording medium 38, and a writing instruction for writing the compressed still image data to the created still image file are set to the instruction list. These instructions are executed by the BG task, and the still image file storing the compressed still image data can be obtained within the recording medium 38.

Figure 16:
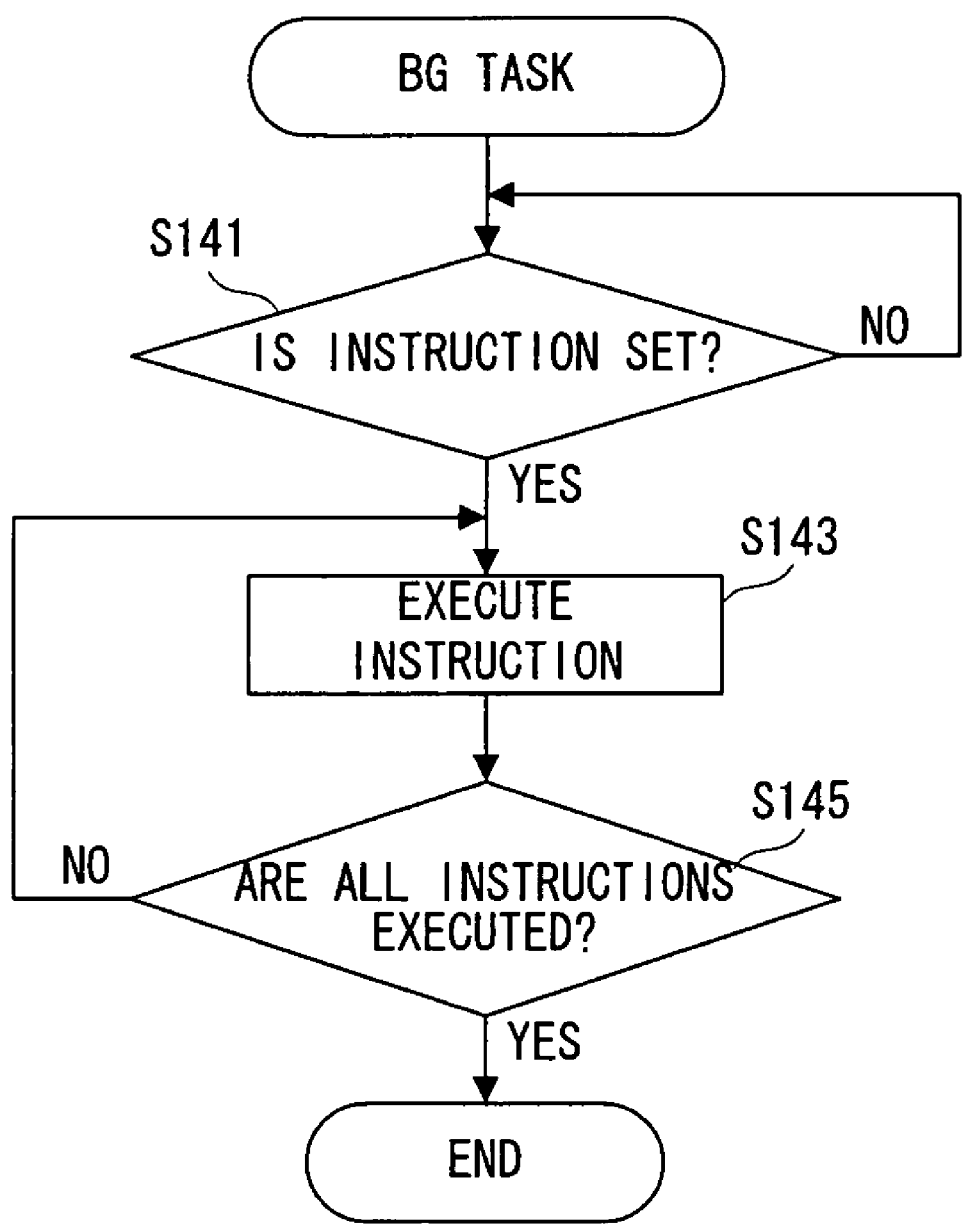
FIG. 16 is a flowchart showing a further part of the operation of FIG. 1 embodiment.
Figure 20:
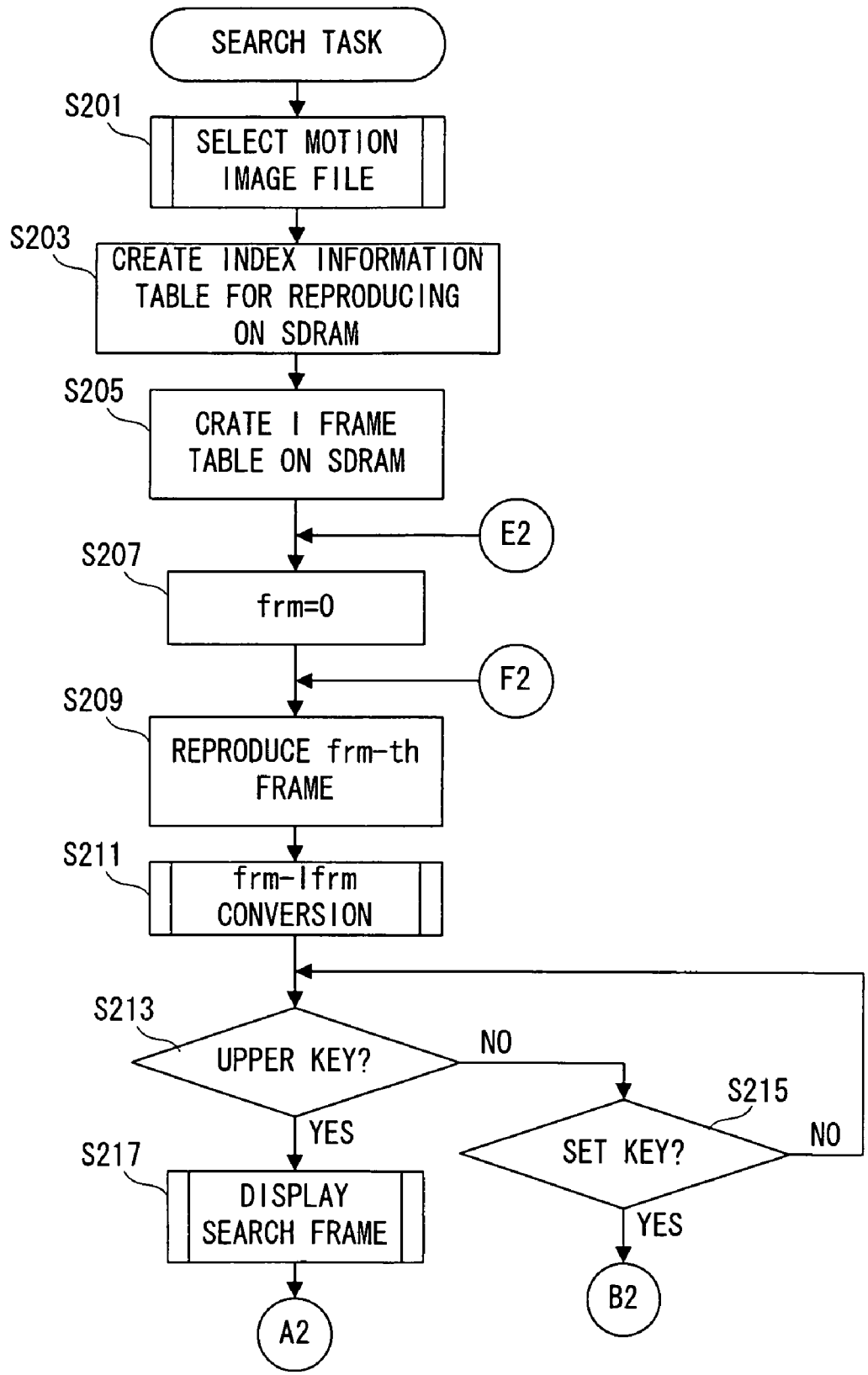
FIG. 20 is a flowchart showing another part of the operation of FIG. 1 embodiment.
Figure 21:
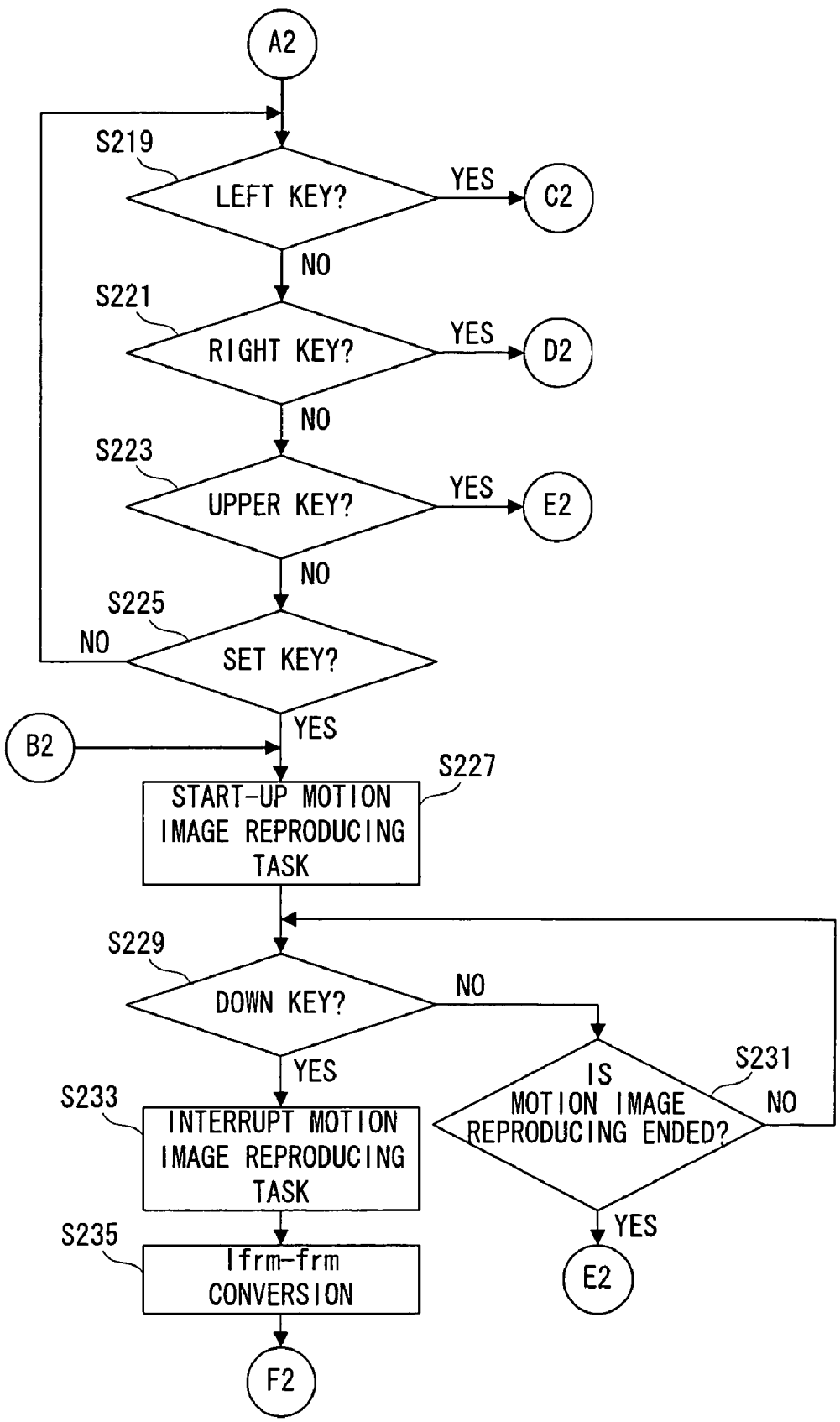
FIG. 21 is a flowchart showing the other part of the operation of FIG. 1 embodiment.
Figure 22:
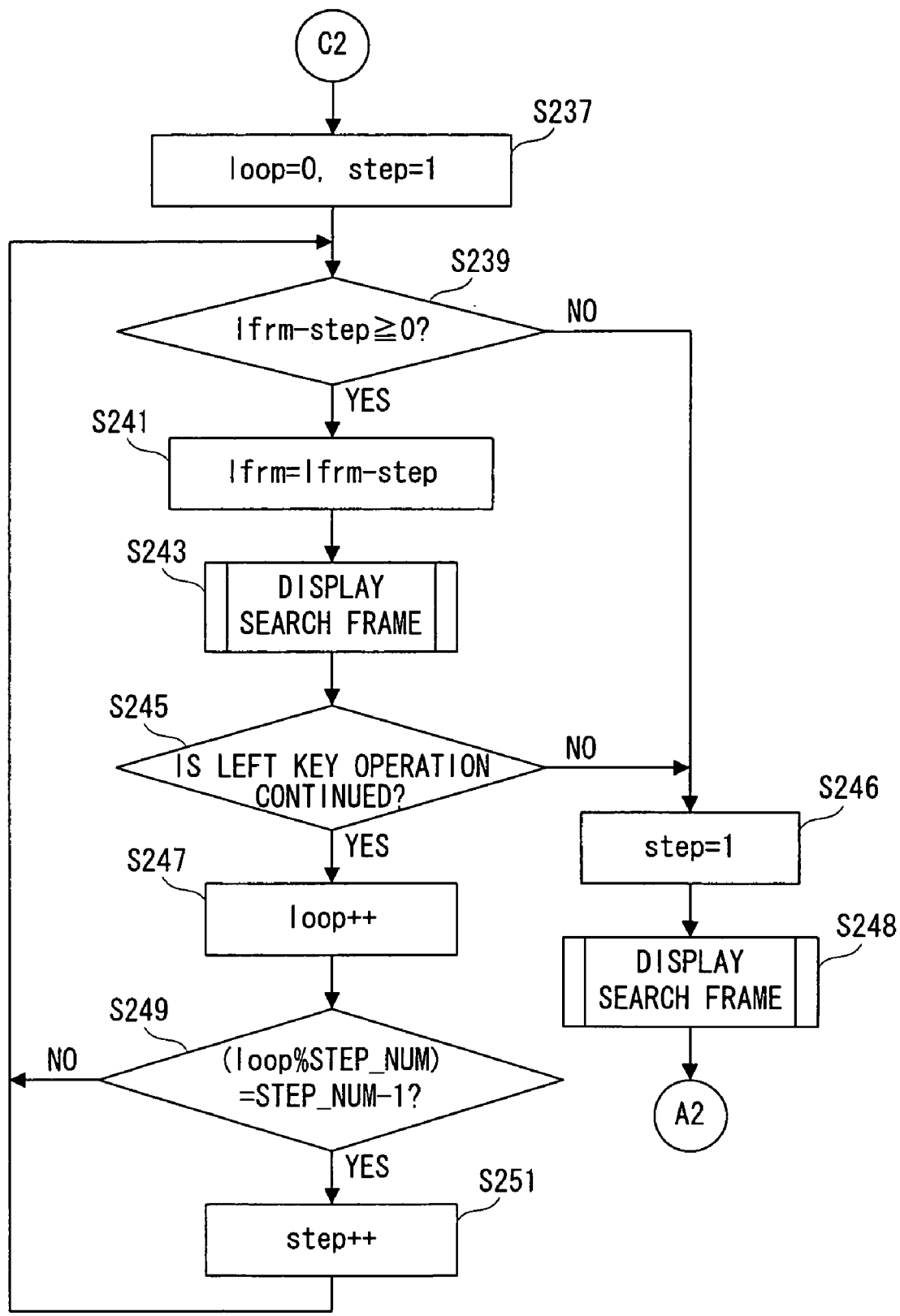
FIG. 22 is a flowchart showing a further part of the operation of FIG. 1 embodiment.
Figure 23:
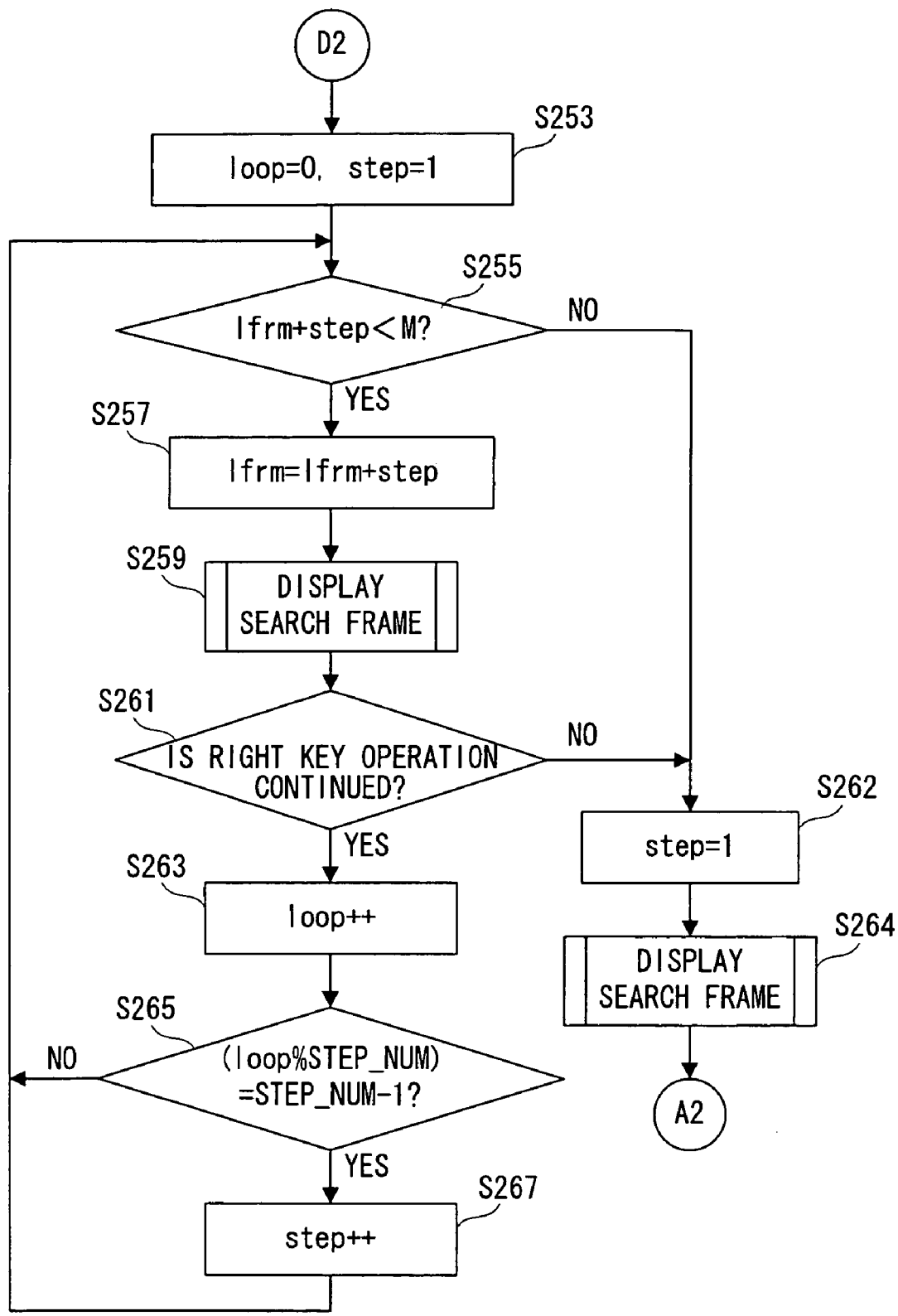
FIG. 23 is a flowchart showing another part of the operation of FIG. 1 embodiment.

With referring to FIG. 16, it is determined whether or not an instruction is set to the instruction list in a step S141, and if "YES" is determined, an instruction is executed once in a step S143. In a step S145, it is determined whether or not all the instructions are executed, and if "NO" is determined, the process returns to the step S1143. Thus, instructions set to the instruction list are successively executed. That is, a desired file is created in the recording medium 38, and desired data is written to the desired file. If "YES" is determined in the step S145, the BG task is ended.

Returning to FIG. 1, when a reproduction mode is selected by the mode key 42d, and a desired motion image file VCLP000*.MP4 is selected, a reproduction process of the motion image file VCLP000*.MP4 is executed. The CPU 40 first reads thumbnail index data from the index file for search VCLP000*.MDX recorded in the recording medium 38, and creates the index information table for reproducing 26i to which the thumbnail index data is written is created in the SDRAM 26. The CPU 40 also detects a frame number of the I frame on the basis of the motion image index data stored in the motion image file VCLP000*.MP4, and creates in the SDRAM 26 an I frame table 26j to which the I frame number is written.

The index information table for reproducing 26i is created as shown in FIG. 17, and the I frame table 26j is created as shown in FIG. 18. According to FIG. 17, the offset t_offset and the size t_size included in the thumbnail index data are assigned to each of the column numbers. According to FIG. 18, the detected frame number is assigned to the column number in ascending order.

The CPU 40 transfers a head frame of the compressed image data stored in the motion image file VCLP000*.MP4 from the recording medium 38 to the SDRAM 26, and applies an expansion instruction to the MPEG-4 codec 34. The MPEG codec 34 reads the head frame of the compressed image data from the SDRAM 26, expands the read compressed image data, and writes the expanded image data to the SDRAM 26. The video encoder 28 reads the image data from the SDRAM 26, converts the read image data into a composite video signal in the NTSC format, and then applies the converted composite video signal to the LCD monitor 30. Thus, a head frame of image is displayed on the LCD monitor 30.

Here, when a set key 42c is operated, a motion image reproduction is executed. The CPU 40 transmits for each one GOP to the SDRAM 26 the compressed motion image data stored in the motion image file VCLP000*.MP4 at a cycle corresponding to one GOP, and applies to the MPEG-4 codec an expansion instruction in response to a vertical synchronization signal. The MPEG-4 codec 34 executes the aforementioned process in response to the vertical synchronization signal. The video encoder 28 also executes the aforementioned process. As a result, the motion image following the head frame is displayed on the LCD monitor 30.

When an upper key 42e is operated, a search screen shown in FIG. 19 (A), FIG. 19 (B) or FIG. 19 (C) is displayed on the LCD monitor 30. The CPU 40 first writes template image data imitating a cinema film to the SDRAM 26. The CPU 40 then transfers two frames or three frames of the compressed thumbnail image data to the SDRAM 26 from the motion image file for search VCLP000*.MSH, and applies an expansion instruction to the JPEG codec 32. The JPEG codec 32 reads the compressed thumbnail image data from the SDRAM 26, performs an expansion process on the read compressed thumbnail image data, and writes the expanded thumbnail image data to the SDRAM 26.

The thumbnail image data is combined with the template image data to thereby obtain search screen data. The video encoder 28 reads this search screen data from the SDRAM 26, and performs the above-described encoding process on the read search screen data. As a result, the search screen shown in any one of FIG. 19(A)-FIG. 19(C) is displayed on the LCD monitor 30. FIG. 19(A) is a search screen of a head section, FIG. 19 (B) is the middle of the search screen, and FIG. 19 (C) is the end of the search screen.

It should be noted that the thumbnail image displayed at the center of the search screen is an image corresponding to a variable Ifrm described later. Also, the thumbnail image displayed at the left of the search screen is an image of the frame existing before a frame corresponding to the variable Ifrm by frames corresponding to the variable step.

In addition, the thumbnail image displayed at the right of the search screen is an image of the frame existing after a frame corresponding to the variable Ifrm by frames corresponding to the variable step.

It should be noted that if the frame corresponding to the variable Ifrm is a head frame, a black image is displayed at the left of the search screen, and if the frame corresponding to the variable Ifrm is the end frame, the black image is displayed at the right of the search screen.

When a right key 42h is operated in a state that the search screen shown in FIG. 19(A) or FIG. 19(B) is displayed, the CPU 40 updates the variable Ifrm in a forward direction to execute the aforementioned process again. Thus, the thumbnail image data to be combined with the template image data is updated in a forward direction. Furthermore, when a left key 42g is operated in a state that the search screen shown in FIG. 19 (B) or FIG. 19 (C) is displayed, the CPU 40 updates the variable Ifrm in the reverse direction to execute the aforementioned process again. The thumbnail image data to be combined with the template image data is updated in the reverse direction. It should be noted that the longer the duration of the operation state of the right key 42h or the left key 42g becomes, the larger the value of the variable step becomes.

When the set key 42c is operated in a state the search screen is displayed, a motion image reproduction is executed using the thumbnail image to be displayed at the center of the search screen as a reference. That is, a GOP corresponding to the thumbnail image at the center is specified, and the above-described motion image reproduction process is performed on a plurality of GOPs starting from the specified GOP.

Figure 24:
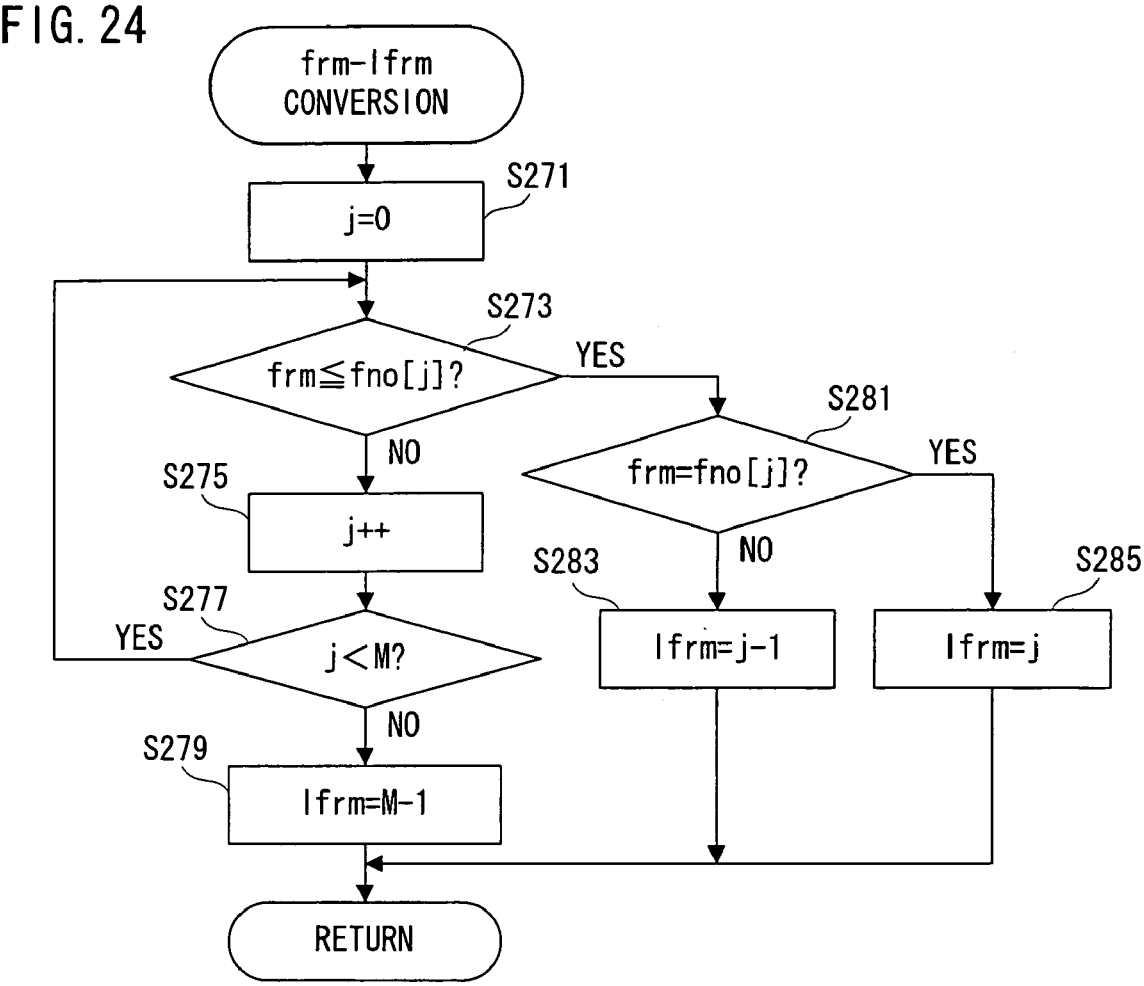
FIG. 24 is a flowchart showing the other part of the operation of FIG. 1 embodiment.
Figure 25:
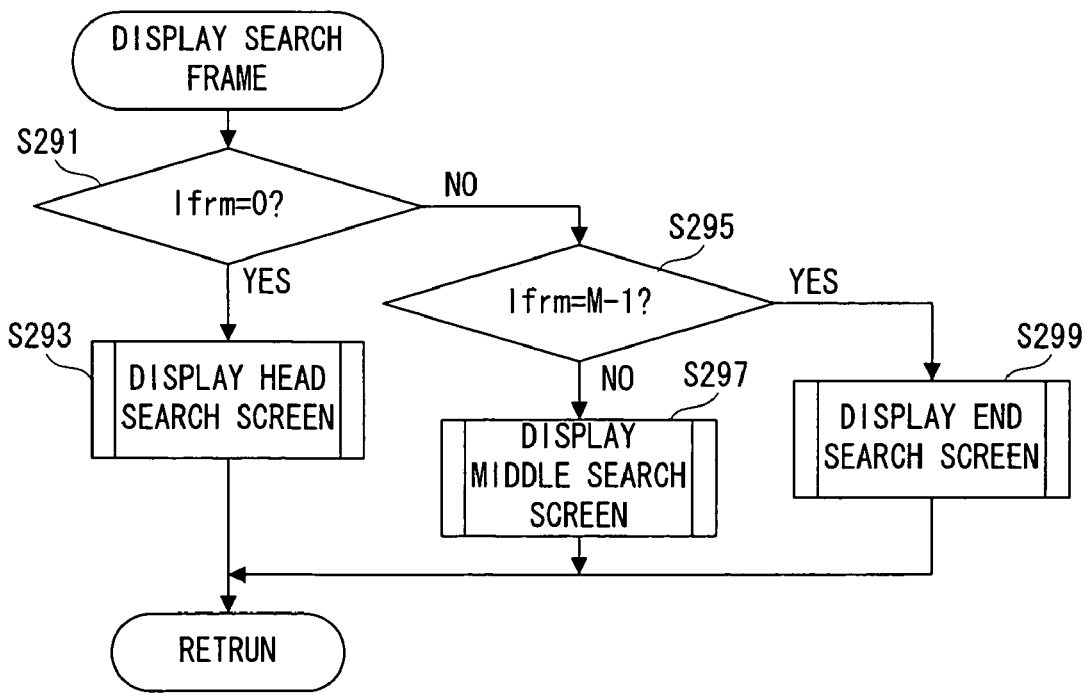
FIG. 25 is a flowchart showing a further part of the operation of FIG. 1 embodiment.
Figure 26:
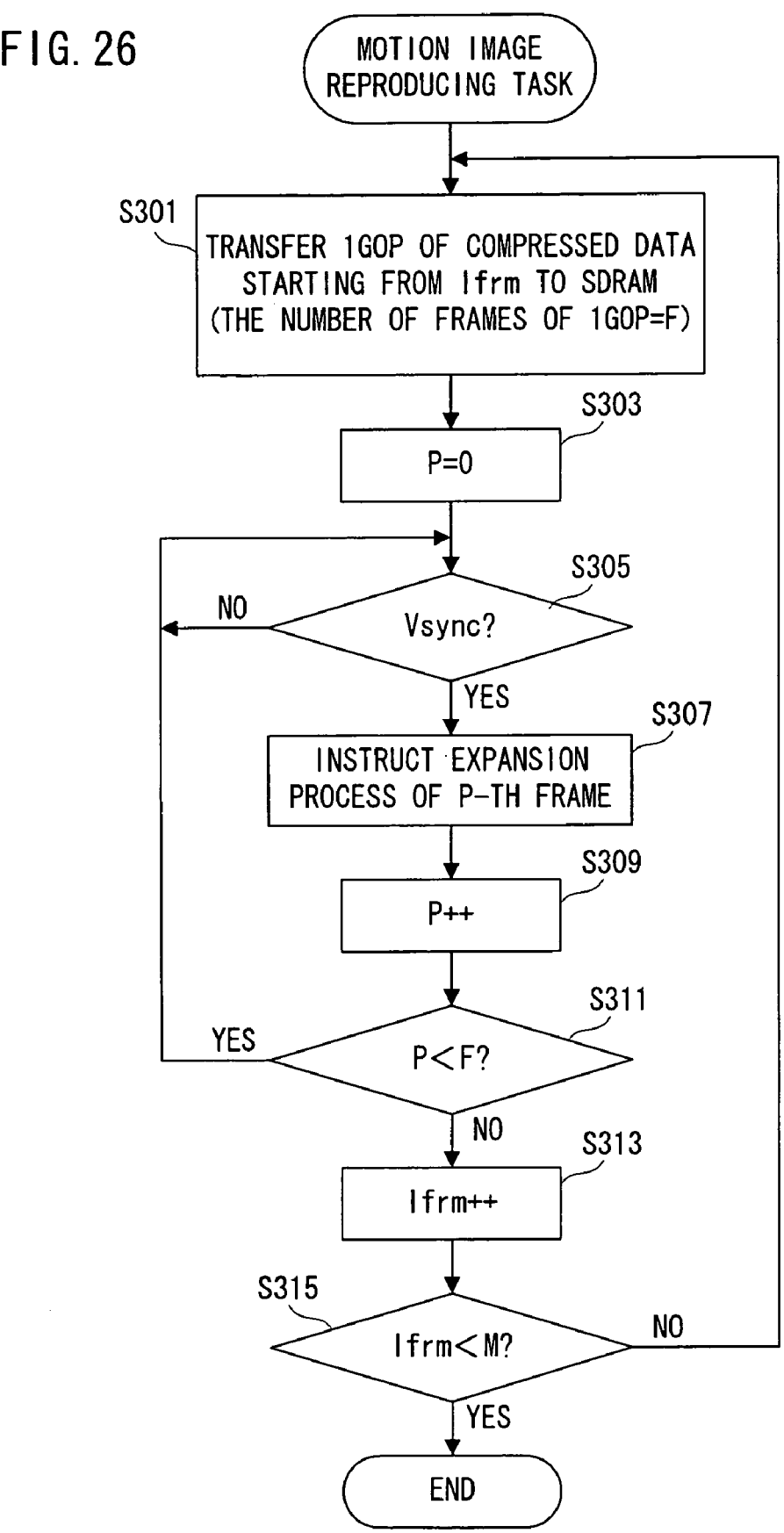
FIG. 26 is a flowchart showing another part of the operation of FIG. 1 embodiment.

The CPU 40 executes a search task according to the flowchart in FIG. 20-FIG. 25, and a motion image reproducing task shown in FIG. 26 when a reproduction mode is selected. A control program according to these flowcharts is also stored in the flash memory 44.

First, in a step S201, a motion image file selecting process is executed. When the desired motion image file VCLP000*.MP4 is selected, the index information table for reproducing 26i shown in FIG. 17 is created on the SDRAM 26 in a step S203, and the I frame table 26j shown in FIG. 18 is created on the SDRAM 26 in a step S205.

In the step S203, the number of frames is calculate on the basis of the size of the index file for search VCLP000*.MDX, the index information table for reproducing 26i having columns corresponding to the calculated number of frames is created, and the thumbnail index data stored in the index file for search VCLP000*.MDX is written to each of the columns. The column number is coincident with the frame number.

In a step S205, the frame number of the I frame is specified on the basis of the motion image index data stored in the motion image file VCLP000*.MP4, and the specified frame number is written to the I frame table 26j in ascending order. Hereafter, the column number of the I frame table 26j is defined as "I frame number".

In a step S207, a variable frm is initialized, and in a succeeding step S209, the form-th frame is reproduced. More specifically, the compressed motion image data of the form-th frame stored in the selected motion image file VCLP000*.MP4 is transferred to the SDRAM 26 from the recording medium 38, and an expansion instruction is applied to the MPEG-4 codec 34. As a result, the head frame of image is displayed on the LCD monitor 30.

In a step S211, a frm-Ifrm conversion process is performed. This specifies the I frame nearest to the frm-th frame after the frm-th frame, and the I frame number assigned to the specified I frame is set as a variable Ifrm. In a step S213, the presence or absence of the operation of the upper key 42e is determined, and in a step S215, the presence or absence of the operation of the set key 42c is determined. When the set key 42c is operated, the process proceeds to a step S227 to reproduce a motion image. When the upper key 42e is operated, a search frame displaying process is executed in a step S217 in order to display any one of the search screens in FIG. 19 (A)-FIG. 19 (C) on the LCD monitor 30.

The presence or absence of the operation of the left key 42g is determined in a step S219, the presence or absence of the operation of the right key 42h is determined in a step S221, the presence or absence of the operation of the upper key 42e is determined in a step S223, and the presence or absence of the operation of the set key 42c is determined in a step S225. When the left key 42g is operated, the process proceeds from the step S219 to a step S237, and when the right key 42h is operated, the process proceeds from the step S221 to a step S253, when the upper key 42e is operated, the process returns from the step S223 to the step S207, and when the set key 42c is operated, the process proceeds to the step S227.

In the step S227, a motion image reproducing task is started-up. Thus, a motion image after the frame corresponding to the variable frm and the later is displayed on the LCD monitor 30. In a step S229, it is determined whether or not the down key 42f is operated, and in a step S231, it is determined whether or not the reproduction of the motion image is completed. If the reproduction of the motion image is completed, the process returns to the step S207. When the down key 42f is operated, the motion image reproducing task is interrupted in a step S233, and a Ifrm-frm conversion process is performed in a step S235. In the step S235, referring to the I frame table 26j, the frame number corresponding to the current variable Ifrm is set as the variable frm. When the variable frm is determined, the process returns to the step S209.

When the process proceeds from the step S219 to the step S237 in response to an operation of the left key 42g, the variables loop and step are set to "0" and "1", respectively. In a succeeding step S239, it is determined whether or not a subtracted value Ifrm-step obtained by subtracting the variable step from the variable Ifrm is equal to or more than "0". If "NO" is determined here, it is considered that the frame to be displayed at the center of the search screen reaches the head frame, the variable step is returned to "1" in a step S246, a search frame displaying process is performed in a step S248, and then, the process returns to the step S219. On the other hand, if "YES" is determined in a step S239, the process proceeds to the step S241 and the later.

In the step S241, the variable Ifrm is updated by the subtracted value Ifrm-step, and in a step S243, a search frame displaying process is performed. In a step S245, it is determined whether or not the operated state of the left key 42g is continued, and if "NO" is determined, the process returns to the step S219 through the process in the steps S246 and S248, and if "YES" is determined, the variable loop is incremented in a step S247.

In a step S249, it is determined whether or not the remainder obtained by dividing the updated variable loop by the constant STEP_NUM (=5) is equal to a subtracted value STEP_NUM-1 obtained by subtracting "1" from the constant STEP_NUM (=5). If "NO" is determined here, the process directly returns to the step S239 while if "YES" is determined, the variable step is incremented in a step S251, and then, the process returns to the step S239. Accordingly, the longer the operated state of the left key 42g becomes, the larger the updated amount of the variable step, that is, the variable Ifrm becomes.

The process executed in steps S253-S267 to be executed when the right key 42h is operated is the same as the process in the steps S237-S251 except that it is determined whether or not the added value Ifrm+step obtained by adding the variable step to the variable Ifrm is less than the constant M in the step S255, the variable Ifrm is updated by the added value Ifrm+step in the step S257, and it is determined whether or not the operated state of the right key 42h is continued in the step S261. Therefore, a duplicated description will be omitted. It should be noted that the constant M is a total number of the columns forming the I frame table 26j.

The frm-Ifrm conversion process complies with a subroutine shown in FIG. 24. First, in a step S271, the variable j is initialized, and in a step S273, it is determined whether or not the variable frm is equal to or smaller than the frame number assigned to the j-th column in the I frame table 26j. If "NO" here, the process proceeds to a step S275 to increment the variable j. In a step S277, it is determined whether or not the updated variable j is less than the constant M, and if "YES" is determined, the process returns to the step S273. If "NO" is determined, the process proceeds to a step S279 to set the subtracted value M-1 obtained by subtracting "1" from the constant M as the variable Ifrm.

If "YES" is determined in the step S273, it is determined whether or not the variable frm is equal to the frame number assigned to the j-th column in a step S281. If "NO" is determined here, the subtracted value j-1 obtained by subtracting "1" from the variable j is set as the variable Ifrm while if "YES" is determined, the variable j is set as the variable Ifrm. After completion of the process in a step S279, S283 or S285, the process is restored to an upper hierarchical routine.

The search frame displaying process is in accordance with a subroutine shown in FIG. 25. In a step S291 first, it is determined whether or not the variable Ifrm is equal to "0", and in a step S295, it is determined whether or not the variable Ifrm is equal to the subtracted value M-1. If "YES" is determined in the step S291, the process proceeds to a step S293 to display the search screen shown in FIG. 19 (A) on the LCD monitor 30. If "NO" in the step S295, the process proceeds to a step S297 to display the search screen shown in FIG. 19 (B) on the LCD monitor 30. If "YES" is determined in the step S295, the process proceeds to a step S299 to display the search screen shown in FIG. 19 (C) on the LCD monitor 30.

After completion of the process in the step S293, S297 or S29, the process is restored to an upper hierarchical routine.

In the motion image reproducing task, in a step S301, the compressed motion image data of one GOP starting from the variable Ifrm is transmitted from the recording medium 38 to the SDRAM 26. At this time, the number of frames forming one GOP is detected, and the detected number of frames is set as a variable F.

In a step S303, a variable P is initialized and the process proceeds from a step S305 to a step S307 in wait for generation of a vertical synchronization signal. In the step S307, an expansion process of the P-frame is instructed to the MPEG-4 codec 34. The MPEG-4 codec 34 reads the compressed image data of the P-th frame from the SDRAM 26 through the memory control circuit 24, expands the read compressed image data, and writes the expanded image data to the SDRAM 26 through the memory control circuit 24. The video encoder 28 reads the expanded image data thus obtained through the memory control circuit 24, and performs an encoding process in accordance with an NTSC format. As a result, a corresponding reproducing image is displayed on the LCD monitor 30.

In a step S309, the variable P is incremented, and in a step S311, the variable P is compared with the variable F. If the variable P is smaller than the variable F, the process returns to the step S305 while if the variable P reaches the variable F, the I frame number Ifrm is incremented in a step S313. It is determined whether or not the I frame number Ifrm updated is less than the variable M in a step S315, and if "NO", the process returns to the step S301. Thus, a motion image moving at a normal speed is displayed on the LCD monitor 30. If "YES" is determined in the step S135, it is considered a motion image reproduction is completed to end the motion image reproducing task.

According to this embodiment, the compressed motion image data output from the MPEG-4 codec 34 at a time of photographing the motion image is a motion image content that expresses a continuous change with time and has the I frame (reference position) allocated intermittently. The CPU 40 records such compressed motion image data onto the recording medium 38d (S69, S105, S143). The CPU 40 also creates motion image index data (position information) pointing each frame of the compressed motion image data output from the MPEG-4 codec 34 in parallel with a compression operation of the MPEG-4 codec 34. The created motion image index data is recorded onto the recording medium 38 by the CPU 40 every time the I frame is satisfied (S67, S103, S143).

Thus, the motion image index data is recorded onto the recording medium 38 every time of specification of the I frame, and whereby, it is possible to reduce the size of the motion image index data to be held in the SDRAM 26 before recording. Consequently, even little amount of the capacity of the SDRAM 26 allows a motion image photographing for a long time.

Also, according to this embodiment, a plurality of frames forming the compressed motion image data have a plurality of I frames (specific still image) which are intermittently exist. The CPU 40 creates a plurality of thumbnail images respectively corresponding to the plurality of I frames (S33, S51, S143), and reproduces at least one of the plurality of the created thumbnail images (S217). When the left key 42g or the right key 42h is operated, the thumbnail image currently reproduced is updated by another thumbnail image existing at a distance of the number of frames corresponding to the variable step (S241, S243, S257, S259). Here, the value of the variable step is changed depending on the operated state of the left key 42g or the right key 42h (S251, S267).

The larger the value of the variable step is, the larger the updated amount of the thumbnail image is, and the smaller the value of the variable step is, the less the updated amount of the thumbnail image is. Therefore, it is possible to improve an operation in search in comparison with a prior art of merely updating the thumbnail image in order.

It should be noted that in this embodiment, when the operated state of the left key 42g or the right key 42h is continued, the value of the variable step is gradually increased, and when the operated state is released, an update of the thumbnail image is suspended at this time. However, after the operated state is released, the variable step is gradually decreased to update the thumbnail image on the basis of the variable step. In this case, at a time when the variable step reaches "1", the update of the thumbnail image is suspended.

Furthermore, in this embodiment, although a semiconductor memory such as a memory card is utilized as a recording medium, a disk medium such as a magneto-optical disk may be utilized in place of this.

In addition, although the contents to be utilized in this embodiment are motion image contents, sound contents may be dealt in place of the motion image contents or together with the motion image contents.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content recording apparatus, comprising:
   an outputter which outputs a video content which expresses a continuous change with time and has a reference position assigned at an intermittent timing;
   a first recorder which records the content output by said outputter onto a recording medium;
   a first creator which creates position information pointing a plurality of positions on the content output by said outputter in parallel with an output operation of said outputter; and
   a second recorder which records the position information created by said first creator onto said recording medium every time that said reference position is specified, wherein
   said content is a motion image content encoded by an MPEG format,
   said plurality of positions includes said reference position and a non-reference position,
   said reference position is a position of a frame on which an intra-encoding is performed, and
   said non-reference position is a position of a frame on which an inter-encoding is performed.

2. A content recording apparatus according to claim 1, further comprising a memory which temporarily stores the content output by said outputter, wherein said first recorder records the content stored in said memory onto said recording medium in synchronous with recording by said second recorder.

3. A content recording apparatus according to claim 1, wherein said first recorder stores said content in a first file formed in said recording medium, and said second recorder stores said position information in a second file formed in said recording medium, and further comprising
   a connector which connects said first file and said second file with each other.

4. A content recording apparatus according to claim 3, further comprising:

a second creator which creates an index content corresponding to said reference position; and a third recorder which records the index content created by said second creator onto said recording medium.

5. A content recording apparatus according to claim 4, wherein said third recorder includes a storage which stores said index content in a third file formed in said recording medium, and a linker which links said third file with said connection file.

6. A content recording apparatus according to claim 5, wherein said linker assigns an identifying number the same as said connection file to said third file.

7. A video camera having a content recording apparatus according to claim 1.

8. A video camera having a content recording apparatus according to claim 2.

9. A video camera having a content recording apparatus according to claim 3.

10. A video camera having a content recording apparatus according to claim 4.

11. A video camera having a content recording apparatus according to claim 5.

12. A video camera having a content recording apparatus according to claim 6.

13. A content recording apparatus according to claim 1, wherein said recording medium that is a removable memory.

* * * * *